United States Patent [19]
Rooney

[11] Patent Number: 6,073,190
[45] Date of Patent: Jun. 6, 2000

[54] SYSTEM FOR DYNAMIC BUFFER ALLOCATION COMPRISING CONTROL LOGIC FOR CONTROLLING A FIRST ADDRESS BUFFER AND A FIRST DATA BUFFER AS A MATCHED PAIR

[75] Inventor: Jeffrey Jay Rooney, Red Wing, Minn.

[73] Assignee: Micron Electronics, Inc., Nampa, Id.

[21] Appl. No.: 08/896,938

[22] Filed: Jul. 18, 1997

[51] Int. Cl.[7] .................................................... G06F 12/02
[52] U.S. Cl. ................................ 710/56; 710/22; 710/52; 710/53; 710/100; 710/101; 710/128; 711/1; 711/117
[58] Field of Search .................................... 395/280, 281, 395/308, 842; 710/22, 100, 101, 128; 711/1, 117

[56] References Cited

U.S. PATENT DOCUMENTS

| | | |
|---|---|---|
| 4,423,482 | 12/1983 | Hargrove et al. . |
| 4,538,226 | 8/1985 | Hori . |
| 4,860,244 | 8/1989 | Bruckert et al. . |
| 5,101,477 | 3/1992 | Casper et al. . |
| 5,117,486 | 5/1992 | Clark et al. ............................. 395/308 |
| 5,185,876 | 2/1993 | Nguyen et al. . |
| 5,293,603 | 3/1994 | MacWilliams et al. . |
| 5,329,489 | 7/1994 | Diefendorff . |
| 5,396,596 | 3/1995 | Hashemi et al. . |
| 5,404,480 | 4/1995 | Suzuki .................................... 711/117 |
| 5,448,704 | 9/1995 | Spaniol et al. . |
| 5,455,915 | 10/1995 | Coke . |
| 5,499,384 | 3/1996 | Lentz et al. . |
| 5,590,377 | 12/1996 | Smith ..................................... 395/842 |
| 5,598,537 | 1/1997 | Swanstrom et al. ..................... 395/281 |
| 5,692,200 | 11/1997 | Carlson et al. ......................... 395/735 |
| 5,694,556 | 12/1997 | Neal et al. ................................. 711/1 |
| 5,761,443 | 6/1998 | Kranich .................................. 395/280 |
| 5,761,457 | 6/1998 | Gulick .................................... 710/128 |
| 5,771,359 | 6/1998 | Galloway ............................... 710/128 |

*Primary Examiner*—Thomas C. Lee
*Assistant Examiner*—Chen Yuan
*Attorney, Agent, or Firm*—Knobbe, Martens, Olson & Bear, LLP

[57] ABSTRACT

A system for dynamically allocating buffers between components in a computer system is described. The system uses matched sets of bi-directional buffers to control data flow between the processor and the computer bus. The dynamic buffer allocation system allows simultaneous data transfer from the processor to the buffers, and from the buffers to the computer bus.

41 Claims, 14 Drawing Sheets

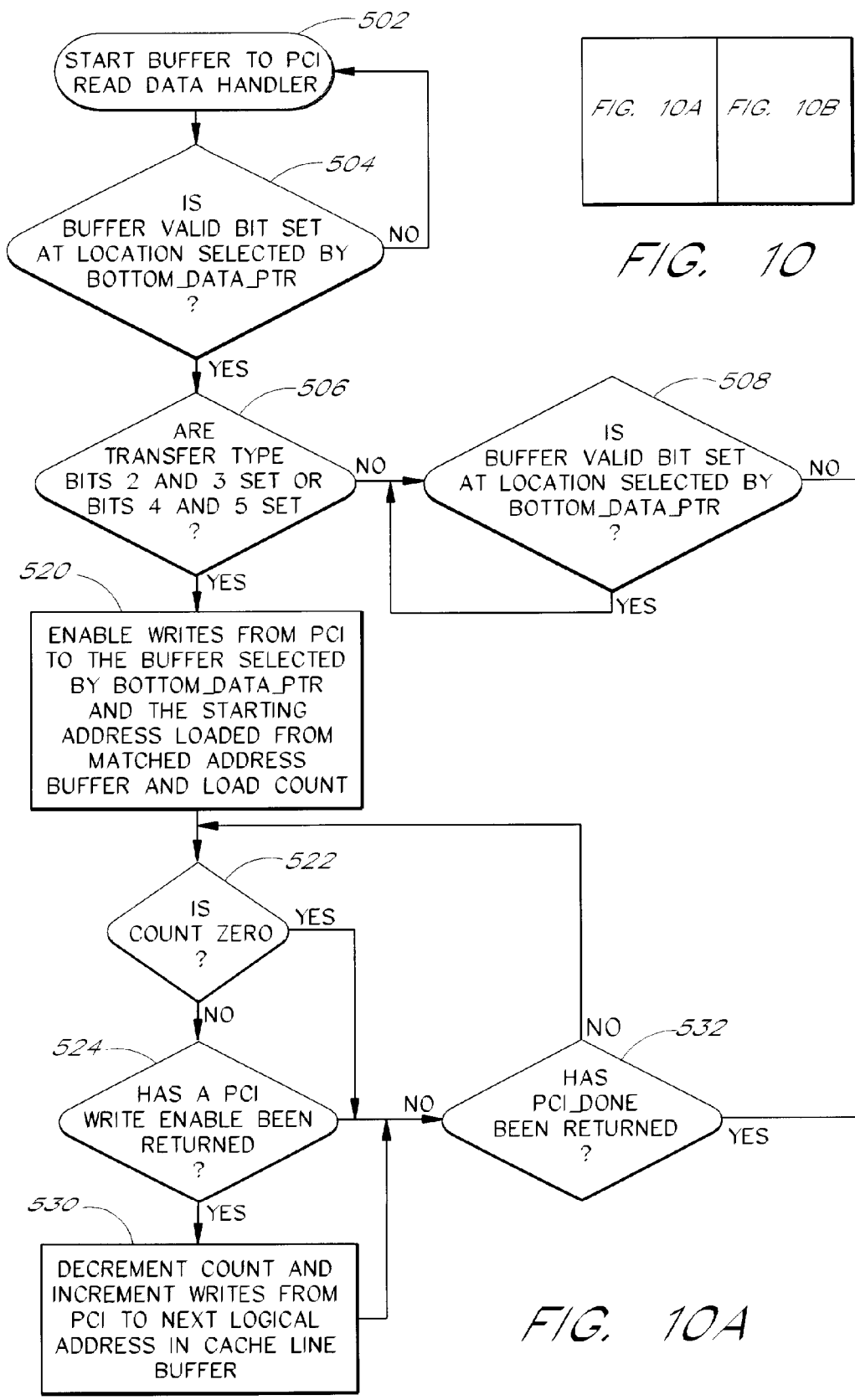

SYSTEM FOR DYNAMIC BUFFER ALLOCATION COMPRISING CONTROL LOGIC FOR CONTROLLING A FIRST ADDRESS BUFFER AND A FIRST DATA BUFFER AS A MATCHED PAIR

BACKGROUND OF THE INVENTION

1. Field of the Invention

The present invention relates to bridge circuits for managing data flow between components of a computer system. More specifically, the present invention relates to a bridge circuit that incorporates a bi-directional buffering system to control address and data transfers between a processor and components attached to a computer bus.

2. Description of the Related Art

Most currently available computer systems include several substructures including a central processing unit ("CPU" or "processor"), a memory architecture, and an input/output (I/O) system. As is well known, the processor processes information that is provided to it by other substructures in the computer system. The memory substructure acts as a storage area for holding commands and data that are eventually acted upon by the processor or other computer components. The input/output system of the computer provides an interface for the computer system to communicate with peripheral devices such as hard disks, monitors and telephone modems. Within the computer are several "buses" that manage communications and data transfers between the various computer substructures. For example, a host bus manages information flow to and from the processor. Accordingly, data and address information moving to and from the processor travels across the processor bus. In addition an I/O bus manages communications between peripheral devices and other parts of the computer system.

As faster processors and peripherals have become available to computer manufacturers, the importance of efficiently transferring address and data information between computer substructures has increased. For example, the I/O bus in early personal computers transferred data at a speed of 8 MHz whereas the I/O bus in modern personal computers runs at 33 MHz.

One factor that has driven the development of more efficient mechanisms for transferring information across the I/O bus is the ever-increasing speed of modern processors. Unfortunately, technology relating to bus substructures has not advanced at the same rate as the technology relating to processors. For example, processors in modern personal computer systems can run at speeds which may be double or triple the speed of the I/O bus. This is mostly due to the inherent difficulty of transferring data through the numerous connectors that allow peripheral devices to communicate with the computer system. Computer system designers have found that communication errors arise when peripheral devices are connected at high bus speeds through many connectors and bridges.

As an example, current Intel® Pentium® Pro-based personal computers have a 200 MHz processor bus and a 33 MHz Peripheral Component Interconnect (PCI) I/O bus. Due to the speed differential between the Pentium® Pro processor bus and the PCI bus, the Pentium® Pro processor is forced, in many instances, to wait through several clock cycles before accessing the PCI bus to send address or data information to a peripheral device.

To circumvent this problem, others have placed First In/First Out (FIFO) buffers between the Pentium® processor bus and the PCI bus. For example, the Intel® 82433LX Local Bus Accelerator Chip includes a four double word deep processor-to-PCI posted write buffer for buffering data writes from the Pentium® processor to peripheral devices on the PCI bus. This buffer is a simple first-in/first-out (FIFO) buffer wherein the destination address is stored in the buffer with each double word of data. In use, the processor-to-PCI posted write buffer is positioned within a bridge circuit, between the processor bus and the PCI bus. As the processor generates data writes to the PCI bus, the data is queued in the posted write FIFO buffer of the Intel® 82433LX.

The FIFO buffered bridge structure of the Intel® 82433LX allows the Pentium® Pro Processor to complete processor to PCI double word memory writes in three processor clocks (with one wait-state), even if the PCI bus is busy on the first clock. Once the PCI bus becomes available, the posted write data stored in the FIFO buffer is written to the designated PCI device. Uncoupling the processor request from the PCI bus in this manner allows the processor to continue processing instructions while waiting to retrieve the designated information from the PCI bus.

In addition to the four double word deep posted write buffer, the Intel® 82433LX also includes a processor-to-PCI read pre-fetch buffer. The pre-fetch buffer is four double words deep and enables faster sequential Pentium® Pro Processor reads from the PCI bus. The Intel® 82433LX read pre-fetch buffer is organized as a simple FIFO buffer that only supports sequential reads from the PCI bus.

In practice, data is sent from the PCI bus, through the processor-to-PCI read pre-fetch buffer, to the processor. Processors such as the Intel® Pentium® Pro include an instruction pre-fetch circuit so they can gather instructions that are about to be executed by the processor.

Unfortunately, attempts at solving the problem of processors running faster than bus substructures have not met with complete success. Many Intel® Pentium® Pro-based computer systems that employ FIFO buffering schemes to manage data traffic between the PCI bus and the processor are still inserting one or more wait states into their bus read and write instructions. This lowers the computer system's performance and causes many software programs to run slower than necessary.

As one example, the Intel® 82433LX only provides a limited flexibility for handling data writes and reads to the PCI bus. In particular, the processor-to-PCI posted write buffer and processor-to-PCI read pre-fetch buffer are both unidirectional FIFOs and therefore do not allow for random access of their contents. Moreover, if the processor is performing a tremendous number of write instructions to the PCI bus, the posted write buffer does not have the flexibility to handle more than four double words. Thus, wait states are inserted into the processor clock until the FIFO buffers are cleared. For all of the above reasons, it would be advantageous to provide a system that had the flexibility to allow additional buffers to become available during peak write and read periods. This flexibility is offered by the system of the present invention.

SUMMARY OF THE INVENTION

One embodiment of the invention is a bridge circuit that includes a dynamic buffer allocation system for efficiently handling data and address transfers between a processor and peripheral devices. Incorporated into the bridge circuit is a bi-directional buffering scheme that provides a tremendous amount of flexibility for processor to peripheral bus reads and writes.

In one embodiment, a dynamic buffer allocation (DBA) system is located within an Intel® Pentium® Pro processor to PCI bus bridge circuit. The DBA system may provide a matched set of three address and three data buffers. These buffers act together to manage data flow between the processor and the PCI bus. In addition, the address and data buffers are "matched" in the sense that each address buffer works in conjunction with only one particular data buffer. These buffers, as described below, allow for a flexible, bi-directional data flow between the processor and peripheral bus of a computer.

In operation, the DBA system buffers write and read requests to and from the processor to the peripheral bus. However, in contrast to previous systems, an embodiment of the DBA system uses matched pairs of address and data buffers. Accordingly, when an address request for a processor data read is sent from the processor to the peripheral bus, it is first buffered by the first available address buffer in the DBA system. As the processor goes on to perform additional instructions, the address request remains in the first address buffer until a free bus cycle is available on the peripheral bus. After the address read request has been sent in a free bus cycle to the target peripheral device, the returning data is sent to the first data buffer since it works in conjunction with the first address buffer. Once the requested read data has been sent from the peripheral bus to the first data buffer, the processor is notified that its requested data is available. Thereafter, the data is sent on the next available processor cycle across the processor bus to the processor.

Data write operations from the processor also function in a similar manner. The processor first sends the destination address to the first available address buffer and the write data to the matched data buffer that works in conjunction with the address buffer. After the data has been sent to the data buffer, the processor is free to work on other instructions. When bus cycles become available on the peripheral bus, the data stored in the data buffer is sent to the address stored in the address buffer.

In another embodiment, the processor is an Intel® Pentium® Pro microprocessor and the peripheral bus is a Peripheral Component Interconnect (PCI) bus. In such a computer, there are five possible data paths which manage three types of data transfers. The three types of data transfers in the Pentium® Pro system are: 1) processor to PCI Write Data, 2) processor to PCI Read Data, and 3) processor to PCI Deferred Data.

As is known, the Intel Pentium® Pro processor may perform a "deferred" data read from the PCI bus by setting a transfer bit that accompanies the address request. After the data is read from the PCI device, it is sent to a deferred data handling circuit before being sent to the processor bus. The deferred data handler keeps track of the outstanding deferred data reads and notifies the Pentium® Pro processor when a deferred data read from a PCI device is available. Five possible data paths for handling address and data transfers within the DBA system are listed below.

1. Input into the data buffers from the processor. (processor to PCI Write Data)
2. Input into the data buffers from the PCI bus. (processor to PCI Read Data or processor to PCI Deferred Data)
3. Output from the data buffers to the processor via the Host Slave. (processor to PCI Read Data)
4. Output from the data buffers to the processor via the Host Master. (processor to PCI Deferred Read)
5. Output from the data buffers to the PCI bus. (processor to PCI Write Data)

One embodiment of the invention is a bridge circuit in a computer system for providing data transfers between a processor and a peripheral device. The bridge circuit includes: a first buffer in communication with a processor and a peripheral device; a second buffer in communication with the processor, the peripheral device and the first buffer; control logic for controlling the first buffer and the second buffer as a matched pair so that an address held in the first buffer corresponds to data held in the second buffer; and an arbiter for controlling concurrent bi-directional data flow between the processor and the peripheral device through the second buffer.

Another embodiment is a dynamic buffer system in an Intel Pentium® Pro computer system for controlling data flow between an Intel Pentium® Pro processor and a Peripheral Component Interconnect (PCI) device. The dynamic buffer system includes: a first buffer in communication with a Pentium® Pro processor and a PCI device; a second buffer in communication with the Pentium® Pro processor, the PCI device and the first buffer; control logic for controlling the first buffer and the second buffer as matched pairs so that an address stored in said first buffer corresponds to data stored in the second buffer; and an arbiter for controlling bi-directional data flow between the Pentium® Pro processor and the PCI device, wherein the data is buffered by the second buffer.

Yet another embodiment of the invention is a bridge circuit for controlling substantially concurrent data transfers between a processor and a peripheral device in a computer system, including: means for buffering address requests from the processor to the peripheral device; means for bi-directionally buffering data transfers between the processor and the peripheral device; and control logic for controlling the means for buffering and the means for bidirectionally buffering so that each of the buffered data transfers relates to an address held in the means for buffering.

DETAILED DESCRIPTION OF THE INVENTION

The present invention relates to a flexible buffering system, termed herein the dynamic buffer allocation (DBA) system, in a computer system, for managing data flow between devices or components of a computer system. These devices and components can be microprocessors, controllers, peripherals or any other substructure in communication with other devices in the computer system. The DBA system is provided within a bridge circuit connecting the processor bus and the peripheral bus of the computer system. Accordingly, address and data requests from the processor first pass through the DBA system before being sent to a peripheral device. Similarly, data being sent back to the requesting processor is also passed through the DBA system.

One implementation of the bridge circuit is within an integrated circuit chip placed on the motherboard of a computer system. However, other systems using the DBA system are also anticipated. For example, the DBA system could be included on a processor board found in a passive backplane-type computer system. In addition, the DBA system could be integrated with the processor onto a single silicon chip and placed within a computer system.

As discussed below, the DBA system increases processor efficiency by allowing the processor to continue processing instructions as the DBA system manages data flow to and from peripheral devices. Peripheral devices can be hard disks, telephone modems, network interface boards and the like which connect to the peripheral bus of a computer system. The DBA system provides concurrent and substantially concurrent data transfers between the host processor and peripheral devices. As used herein, the term "substantially concurrent" includes data transfers that occur within one or several clock cycles of each other. However substantially concurrent data transfers should not be construed to limit the data transfers to occur within a pre-determined period of time. In computer systems that include the DBA system, data can be simultaneously flowing between the host processor and the peripheral devices due to the bi-directional data handling capabilities of the DBA system.

Figure 1:
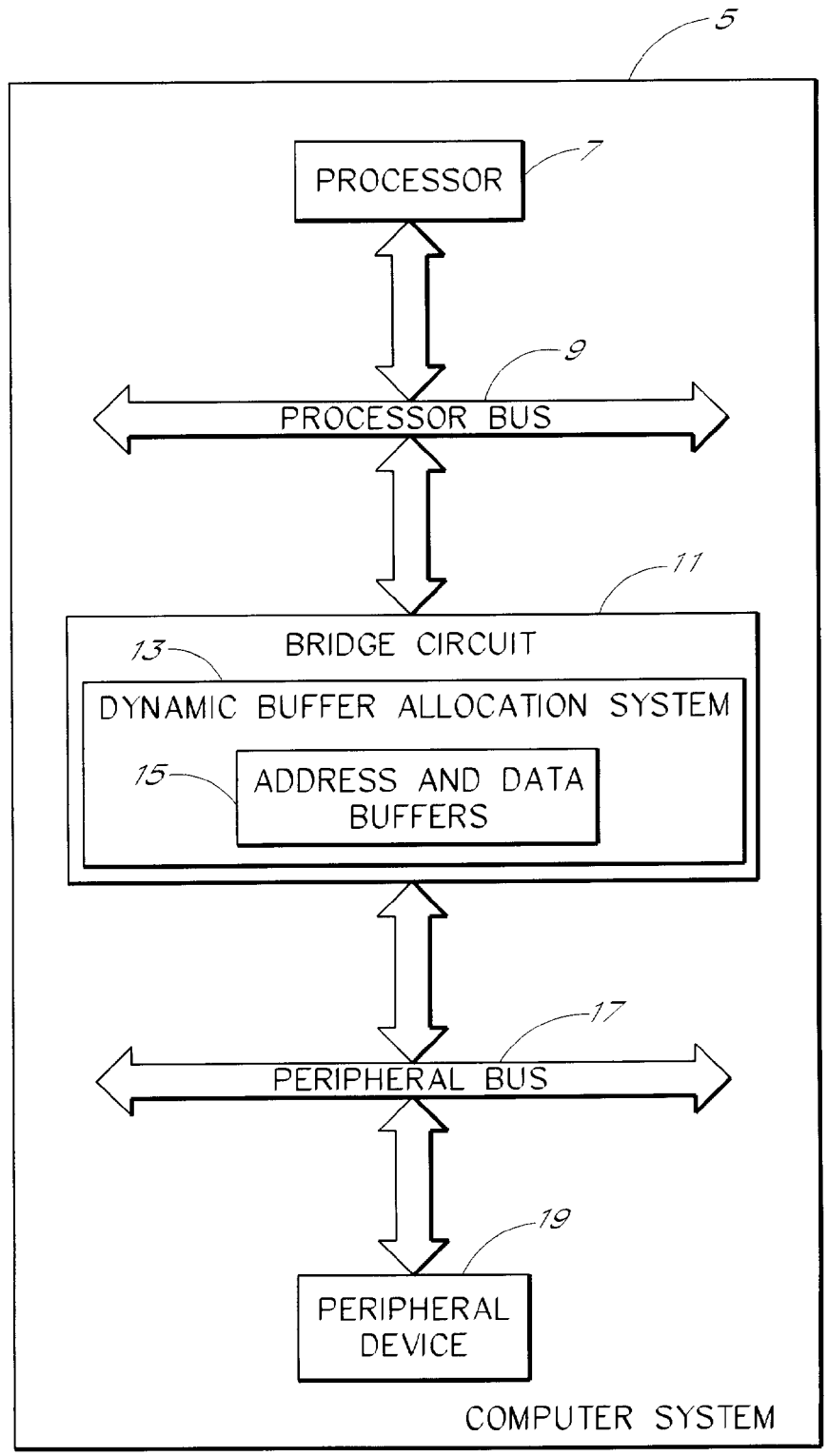
FIG. 1 is a block diagram illustrating an overview of the relationship between a Central Processing Unit (processor), Bridge Circuit and PCI device in a computer system.

FIG. 1 is a block diagram of a computer system 5. The computer system 5 includes a processor 7 that connects via an external processor bus 9 to a bridge circuit 11. In one embodiment, the processor is an Intel® Pentium® Pro processor, although other processors can be used in conjunction with the DBA system. Such processors include the Pentium II processor from Intel, the Alpha® processor from Digital Equipment Corporation and the PowerPC® processor from Motorola Corporation. Integral to the bridge circuit 11 is a dynamic buffer allocation system 13. Within the dynamic buffer allocation system 13 are address and data buffers 15.

As shown, the bridge circuit 11 connects through a peripheral bus 17 to a peripheral device 19. Accordingly, from FIG. 1 it is seen that address requests and data that travel from the processor 7 to the external peripheral bus 17 first pass through the bridge circuit 11. As will be described below, the dynamic buffer allocation system 13 located within the bridge circuit 11 acts as a flexible buffer, allowing the processor to continue processing instructions as data is being simultaneously written to or read from peripheral devices.

Overview

Figure 2:
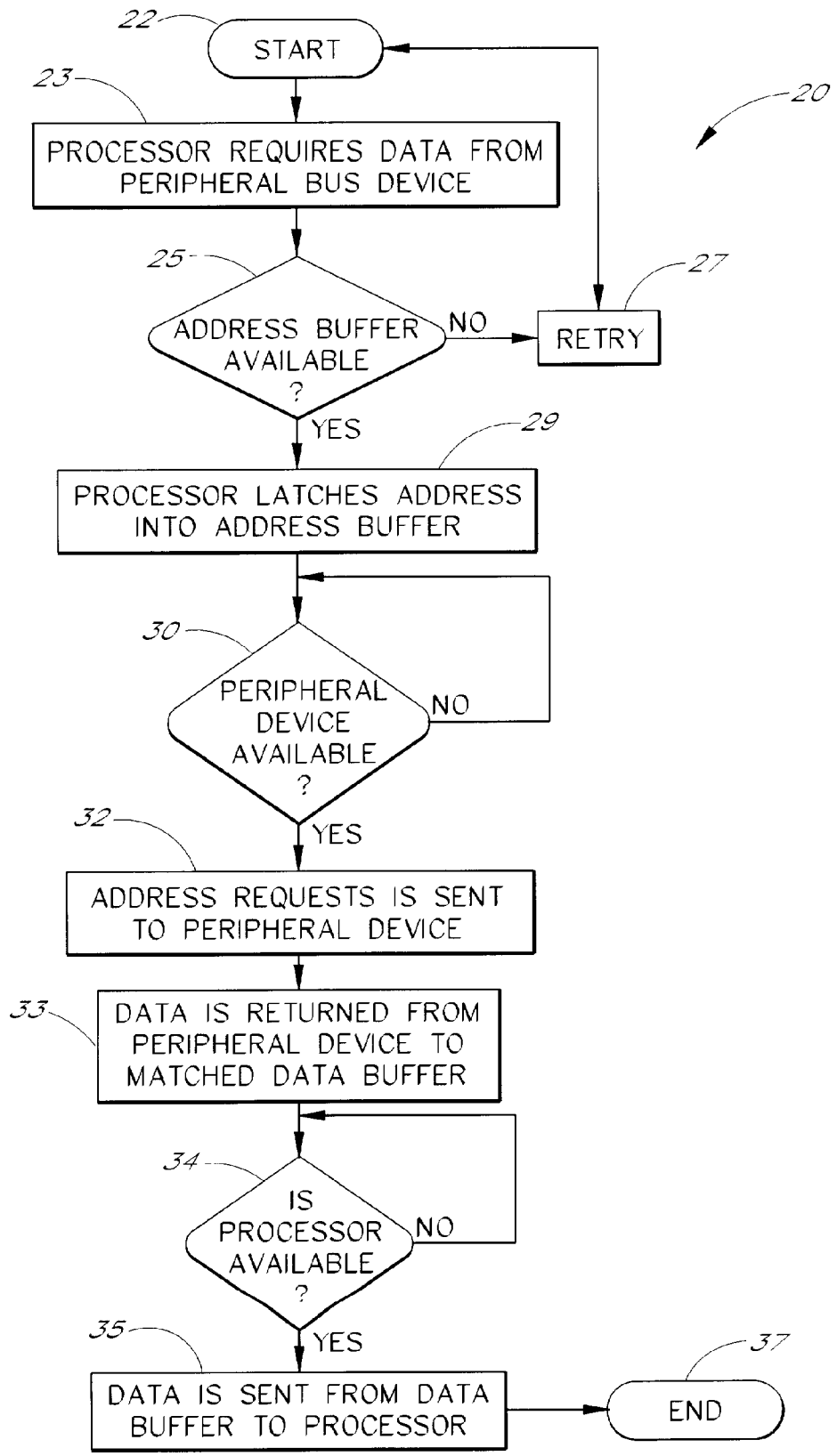
FIG. 2 is a flow diagram illustrating an overview of the process a computer system using the DBA bridge circuit undergoes to perform a data read from a peripheral device.

FIG. 2 is a flow diagram illustrating an overview of the process 20 performed by a computer system having one embodiment of a DBA system to read data from a peripheral device. The process 20 of reading data from a peripheral device begins at a start state 22 and then moves to state 23 wherein the processor requires data from a peripheral bus device 19. The process 20 then moves to decision state 25 wherein an inquiry is made whether any of the address buffers in the DBA system 13 are available. As discussed above, the address buffers are used to buffer address and status information from the processor before it is sent to the peripheral bus.

If none of the address buffers are available, the process 20 moves to state 27 wherein the processor 7 is instructed to retry the cycle at a later time. If an address buffer is determined to be available at decision state 25, the address is latched into the first available address buffer in the bridge circuit at a state 29. Once the address is latched into the address buffer at state 29, the process 20 moves to decision state 30 to inquire whether the peripheral device is available to receive the address request. If the peripheral device is not available to receive the address request, then the process 20 loops about decision state 30 until the peripheral device becomes available.

Once the peripheral device becomes available at decision state 30, then the process 20 moves to state 32 wherein the address request is sent to the peripheral device. Once the peripheral device has retrieved data from the requested address, the process 20 moves to state 33 wherein the data is returned to a data buffer within the DBA system 13 that is matched to the address buffer. As discussed above, the address buffers and data buffers work as matched pairs. Accordingly, data returned from a request made by a particular address buffer is sent to a predetermined data buffer. Once the data has been stored in the data buffer, a determination is made at a decision state 34 whether the processor is available. If the processor is not available, then the process loops back to decision state 34. Once the processor becomes available the process 20 moves to state 35 wherein data returned from the peripheral device 19 is sent from the data buffer to the processor 7. The process then ends at an end state 37.

Figure 3:
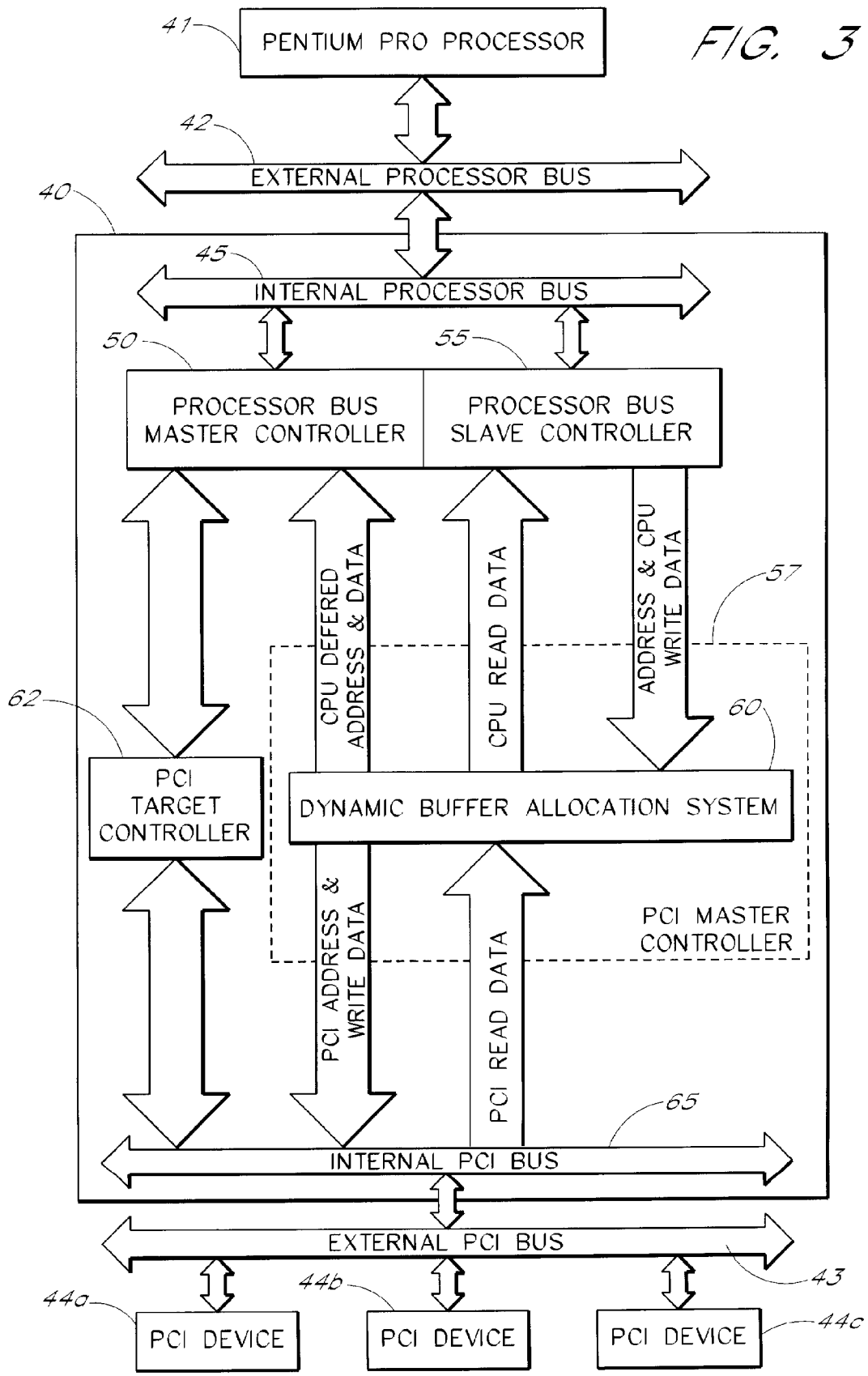
FIG. 3 is a block diagram of the Bridge Circuit of FIG. 1, including details of the dynamic buffer allocation (DBA) system.

Referring now to FIG. 3, a detailed block diagram of one embodiment of a Pentium processor to PCI bridge circuit 40 is shown. An Intel Pentium® Pro processor 41 is linked through an external processor bus 42 to the bridge circuit 40. The bridge circuit 40 communicates across a PCI bus 43 to a set of PCI devices 44a–c. Thus, address and data information that is sent to PCI devices 44a–c from the Pentium® Pro Processor 42 first passes through the bridge circuit 40.

As shown in FIG. 3, the external Pentium® Pro processor bus 42 is in communication with an internal processor bus 45 in the bridge circuit 30. The internal processor bus 45 transfers all address and data communication from the external Pentium® Pro bus 42 to the internal components of the bridge circuit 40. Similar to the external Pentium® Pro bus 42, in one embodiment the internal processor bus 45 has a 32 bit address bus and 64 bit data bus to manage address and data communication to and from the Pentium® Pro processor 41.

Connected to the internal processor bus 45 is a processor bus master controller 50 and processor bus slave controller 55. The processor bus master controller 50 handles transfers of deferred cycle retries and replies that are sent from the PCI devices 44a–c to the Pentium® Pro processor 41. As discussed above, the deferred data is managed by a deferred response handler within the processor bus master controller 50. For a complete discussion of a deferred data handler within a Pentium® Pro computer system see Intel® Corporation's *Pentium Pro Family Developer's Manual,* Volume #1 which is incorporated by reference.

The processor bus slave controller 55 controls address and data writes from the Pentium® Pro processor 41 to the bridge circuit 40 and also decodes and directs processor requests to the PCI bus 43. In addition, the processor bus slave controller 55 transfers read data from the designated PCI device 44 to the Pentium® Pro Processor 41.

Linked to the processor bus master controller 50 and bus slave controller 55 is a PCI Master Controller 57 which includes one embodiment of a DBA system 60. As discussed above, the DBA system 60 buffers request and data transfers between the Pentium® Pro processor 42 and all of the PCI devices 44a–c residing on the PCI bus 43. CPU requests that are directed to the PCI bus will pass through the PCI Master Controller 57. Other CPU requests will be directed to their correct destination by the CPU Bus Slave Controller 55 or an alternative controller (not shown). The only cycles that the PCI target controller 62 processes are the cycles generated by the PCI devices 44a–c. The PCI target controller 62 handles requests originated from the PCI devices 44a–c to the processor 41 that route through the bus master controller 50. In addition, the PCI target controller 62 manages PCI device requests that are sent to the main memory of the computer system.

In order for the bridge circuit 40 to communicate with the external PCI bus 43, an internal PCI bus 65 is provided to place data and address information onto the 32-bit address and 32/64-bit data lines of the external PCI bus 43. Thus, a 32-bit deferred read request to the PCI bus 43 from the Pentium® Pro processor 41 travels through the external Pentium® Pro bus 42 and onto the internal processor bus 45 of the bridge circuit 40. The bus slave controller 55 decodes the PCI read request and directs it to the DBA system 60. The PCI address that is sent with the Pentium® request is then buffered in one of the address buffers (not shown) within the DBA system 60. At this point, the Pentium® Pro Processor 41 can continue to execute instructions.

Once the PCI bus 43 is free to accept read requests from an address buffer within the DBA system 60, the request is sent out along the internal PCI bus 65 and finally outside of the bridge circuit 40 to the external PCI bus 43. From the external PCI bus 43 the read request is sent to a target PCI device 44a–c which accepts the address request and prepares the requested data for transmission to the Pentium® Pro Processor 41.

The requested data follows the opposite path, through the PCI bus 43, internal PCI bus 65 and into a data buffer (not shown) within the DBA system 60. The DBA system 60 then makes a request of the bus master controller 50 to perform a deferred retry or deferred reply cycle to the Pentium® Pro processor 41. After the bridge circuit 40 is notified that the processor bus is free, the data is written out to the bus master controller 50 and thereafter placed on the internal processor bus 45, external Pentium® Pro bus 42 and finally sent to the Pentium® Pro processor 41 for processing.

The Address Buffers

Figure 4:
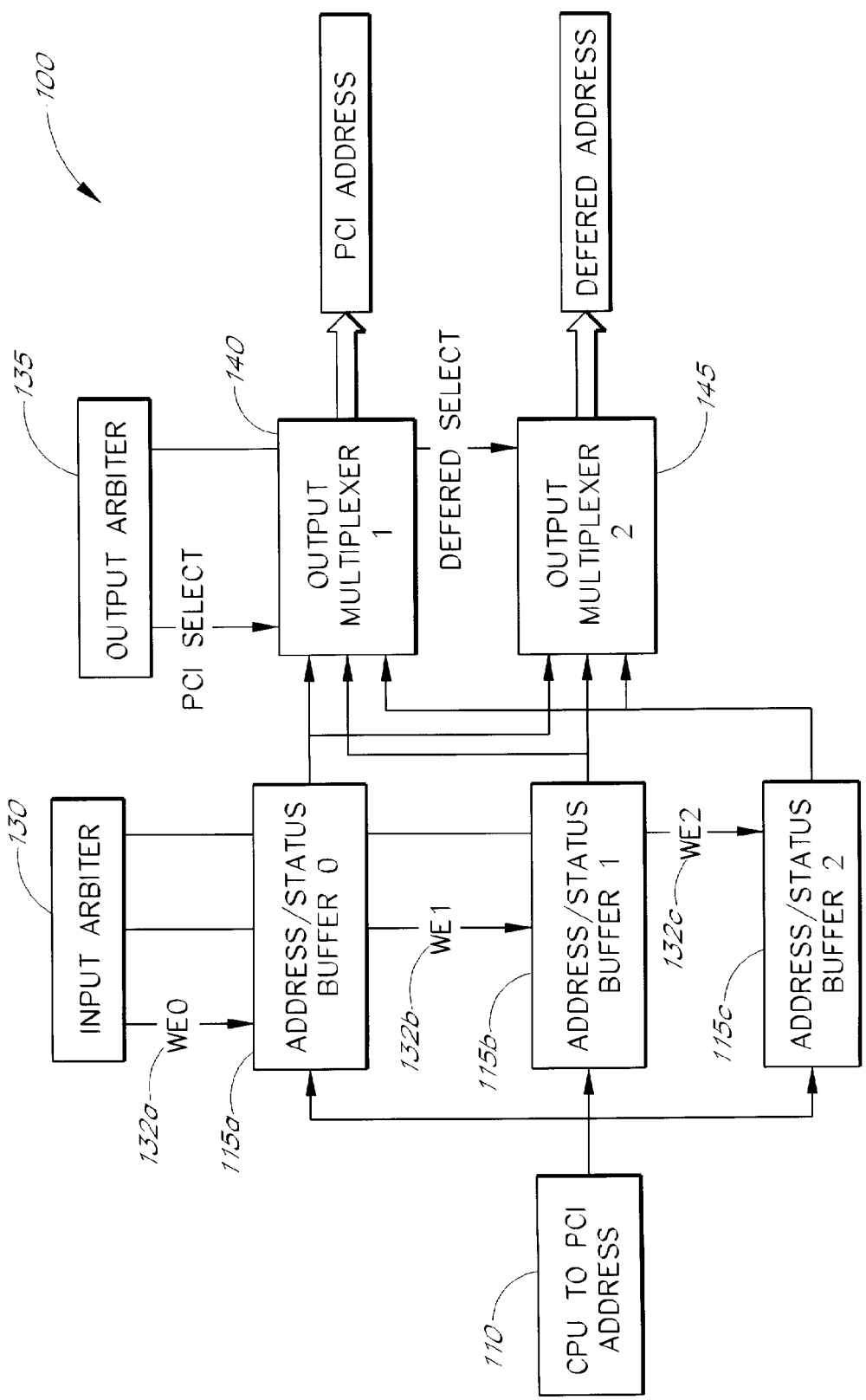
FIG. 4 is a block diagram of the address buffers that are part of the dynamic buffer allocation system shown in FIG. 3.

As discussed above, the DBA system 60 includes separate sets of address and data buffers. Referring now to FIG. 4, a block diagram of the dynamic buffer allocation system address buffers 100 is shown. As illustrated, a processor to PCI address request 110 arrives from the bus slave controller 55. The address request 110 may be for one of a PCI read, PCI deferred read, or PCI write. The address request 110 can be buffered by any of three separate buffers 115a–c, but the system provides a mechanism for pointing the address request to the first available buffer. It should be noted that although the embodiment illustrated in FIG. 4 contains three buffers 115a–c, the DBA system can incorporate any number of buffers.

Additional status information relating to the address may be sent with the address request. For example, a transfer type bit may be sent that designates the type of request (eg: read, write, deferred read, etc.) being made by the Pentium processor 41 for the requested address. This status information may be stored within each of the address buffers 115a–c. The structure of one embodiment of an address buffer is shown in Table 1 below.

TABLE 1

Structure of Address Buffer

Address (31:3)
Buffer Valid Bit
Responder Request Bit
Transfer Type (Bit 0) - processor Write
Transfer Type (Bit 1) - PCI Write
Transfer Type (Bit 2) - processor Read
Transfer Type (Bit 3) - PCI Read
Transfer Type (Bit 4) - processor Deferred Read
Transfer Type (Bit 5) - PCI Deferred Read
Count - Number of pieces of data to transfer
Postable - Bit to indicate that the processor to PCI write was posted Address (31:3)

This is the 32-bit address being requested by the processor.

Buffer Valid Bit

The buffer valid bit is a bit that may be set when an address request initiator, such as the Pentium® Pro Processor 41 or PCI device 44, requests a transfer and it is accepted. A cycle initiated by a PCI device 44 is normally sent to the PCI target controller 62 or to another PCI device. The bit may be cleared upon completion of the cycle, indicating that the buffer is available for another address request. This bit may be set when a processor to PCI read or write cycle is initiated by the processor and may be cleared upon the write completing on the PCI bus or the read completing on the processor bus.

Responder Request Bit

This bit may be set when the response agent (e.g.: target of the address request) needs to take action. It can be cleared when the response agent is finished performing its task. This bit may be set, for example, when the Pentium processor 41 has written data to the matched data buffer for a processor-to-PCI write cycle and cleared when the data has been written from the data buffer to the PCI bus. In addition, this bit may be set immediately for a processor-to-PCI read and cleared when read data has been returned from the PCI bus to the appropriate data buffer.

Transfer Type Bits

The transfer type bits are matched pairs of bits that are normally set together, but cleared individually. These bits are used within the DBA system to track the type and state of each buffer. Table 2 below provides a description of the transfer type bits utilitized in this embodiment of the invention.

TABLE 2

Transfer Type Bits

| Bit 5 | Bit 4 | Bit 3 | Bit 2 | Bit 1 | Bit 0 | Description |
|---|---|---|---|---|---|---|
| 0 | 0 | 0 | 0 | 0 | 0 | No transfer for this buffer |
| 0 | 0 | 0 | 0 | 1 | 1 | The processor has requested a write to the PCI bus but the data hasn't been written to the data buffers yet. |
| 0 | 0 | 0 | 0 | 1 | 0 | The processor has written the write data to the buffers and the DBA system can perform the PCI write transaction. The status bits stay in this state until the PCI write cycle has finished. |
| 0 | 0 | 1 | 1 | 0 | 0 | The processor has requested a read from the PCI bus but the buffers have not received the PCI data. |
| 0 | 0 | 1 | 0 | 0 | 0 | The PCI bus has returned read data from a PCI device. It is safe to send the read data from the buffers back to the processor through the processor bus slave controller 55. |
| 1 | 1 | 0 | 0 | 0 | 0 | The processor has requested a deferred read from the PCI bus, but the data buffers have not received the read data from the PCI device. |
| 1 | 0 | 0 | 0 | 0 | 0 | The PCI bus has returned read data from a PCI device and it is now safe to send the deferred read data from the buffers back to the CPU through the processor bus master controller 50. |

Transfer Type Bit 0: (Processor Write)

This bit may be set when the processor initiates a write and is cleared when the processor has finished writing data to the data buffer.

Transfer Type Bit 1: (PCI Write)

This bit may be set when an initiator requests a PCI write cycle and is cleared when all write data has been transferred to PCI bus.

Transfer Type Bit 2: (Processor Read)

This bit may be set when the processor initiates a read and is cleared when the read data is returned from the matched data buffer to the processor.

Transfer Type Bit 3: (PCI Read)

This bit may be set when an initiator requests a PCI read cycle and is cleared when PCI read data has been returned to the data buffer.

Transfer Type Bit 4: (Processor Deferred Read)

This bit may be set when the processor initiates a deferred read and is cleared when deferred read data is returned to the processor.

Transfer Type Bit 5: (PCI Deferred Read)

This bit may be set when an initiator requests a PCI deferred read and is cleared when the PCI device returns read data to the matched data buffer.

As noted above, the status information included within the address buffers 115a–c may include whether a processor write, PCI write, processor read, PCI read, processor deferred read or PCI deferred read is being requested for the specific address.

Many signals can be used to control communications between the Pentium® Pro Processor 41, bridge circuit 40 and PCI device 44. These signals are also used to designate which address (or data) buffer should receive a particular request from the Pentium® Pro Processor 41. As can be imagined, it is important for the system to ensure that the proper address is sent to the proper PCI device 44. In addition, because the address and data buffers are separated, the system needs to monitor which address and data buffer has completed its task and is available for more work. The following signals, as listed in Table 3, are used by the internal modules of the bridge circuit 40 to coordinate the movement of information between the modules and by the PCI master controller. Signals that begin with "HS" communicate between the PCI master controller 57 and the CPU slave controller 55. Signals that begin with "HM" communicate between the PCI master controller 57 and the CPU Bus master controller 50. Signals that begin with "PCI" communicate internally between the PCI master controller 57 and a PCI bus interface controller (not shown) which actually controls signals on the PCI bus.

TABLE 3

Signals Used to Control Address Buffers

| SIGNAL | DESCRIPTION |
|---|---|
| HS_REQ | Set by CPU Bus Slave Controller 55 to request transfer to the dynamic buffer allocation system and indicates that a valid address and status bits are waiting on the processor bus. |
| HS_ACK | Set by DBA system 60 to notify the CPU Bus Slave Controller 55 that the requested transfer has been accepted. |
| HS_DONE | Set by the DBA system 60 to signal that the CPU Bus Slave Controller 55 has finished a read transfer to the processor 41, a posted write request, a non-posted write data or a deferred request. |
| HM_REQ | Set by the dynamic buffer allocation system 60 to request a data transfer from the CPU Bus Master Controller 50 to the processor 41 and indicates that a valid address and status are waiting on the processor bus 42. |

TABLE 3-continued

Signals Used to Control Address Buffers

| SIGNAL | DESCRIPTION |
| --- | --- |
| HM_ACK | Set by the CPU Bus Master Controller 50 to notify the dynamic buffer allocation system that the requested data transfer to the processor 41 has been accepted. |
| HM_DONE | Set by the CPU Bus Master Controller 50 when a deferred read transfer to the processor 41 has been completed. |
| PCI_REQ | Set by dynamic buffer allocation system 60 to notify the PCI control logic (arbiter) that the dynamic buffer allocation system 60 requires a PCI bus cycle to transfer data to the PCI bus 45. |
| PCI_ACK | Set by PCI control logic to acknowledge that the PCI bus cycle requested by the dynamic buffer allocation system 60 has been accepted. |
| PCI_DONE | Set by PCI control logic to indicate that the PCI cycle is finished. |
| HS_REQ_RETRY | Given by the CPU bus master controller 50 to instruct the processor 41 to retry the cycle later. |
| top_addr_ptr | Points to the next empty Address/Status Buffer in the dynamic buffer allocation system 60. |
| bottom_addr_ptr | Points to the oldest unfinished Address/Status Buffer that does not contain a unfinished deferred cycle that has finished on the PCI bus 43. |
| defer_addr_ptr | Points to the oldest unfinished Address/Status Buffer that indicates a deferred cycle. |

Note:
bottom_addr_ptr = PCI_Select in FIG. 4
defer_addr_ptr = Deferred_Select FIG. 4.
HM = Processor Bus Master Controller
HS = Processor Bus Slave Controller The embodiment of the DBA system 60 illustrated in FIG. 4 includes an input arbiter 130 that provides control signals to the address buffers 115a–c. The input arbiter 130 interprets the signals described in Table 3, and toggles write enable signals 132a–c that direct the incoming address request 110 into an available buffer.

As discussed above, the address buffers 115a–c may include three signal paths; one input and two output. The input path may be used to write PCI address transfer requests into the address buffers 115a–c. This may be done when both the HS_REQ and HS_ACK signals are asserted, indicating that the Pentium® Pro processor 41 has put an address request (HS_REQ) on the processor bus 42 and it has been acknowledged (HS_ACK). Once these signals are set, the address and status information is latched into the buffer pointed to by the pointer, top_addr_ptr.

For example, when top_addr_ptr points to buffer 115a (e.g.: top_addr_ptr=0) and signals HS_REQ and HS_ACK are asserted (HS_REQ=1; HS_ACK=1), the system may assert a write enable 0 (WE0) signal 132a. This enables the system to write the address and status information into buffer 115a on the next clock cycle. Following a successful write to buffer 115a, top_addr_ptr is incremented by one (top_addr_ptr=1), thereby pointing to buffer 115b. Note that the top_addr_ptr count for the three buffer implementation illustrated in FIG. 4 is 0-1-2-0-1-2-0. Through this mechanism, incoming requests are sent to the first available address buffer 115a–c.

The output path corresponding to an address request to read deferred data is determined by the pointer defer_addr_ptr. The defer_addr—ptr will follow the top_addr_ptr until a deferred transfer has been accepted, then it points to the chosen buffer until the deferred data transfer is completed. The defer_addr_prt pointer will then point to the next buffer having a deferred transfer request, if there is one, or begin following the top_addr_ptr pointer again. In most situations, the defer_addr_ptr pointer is incremented to next the deferred transfer or follows top_addr_ptr when read data is returned from the PCI bus to the data buffers (signaled by PCI_DONE) followed by HM_DONE.

The Data Buffers

Figure 5:
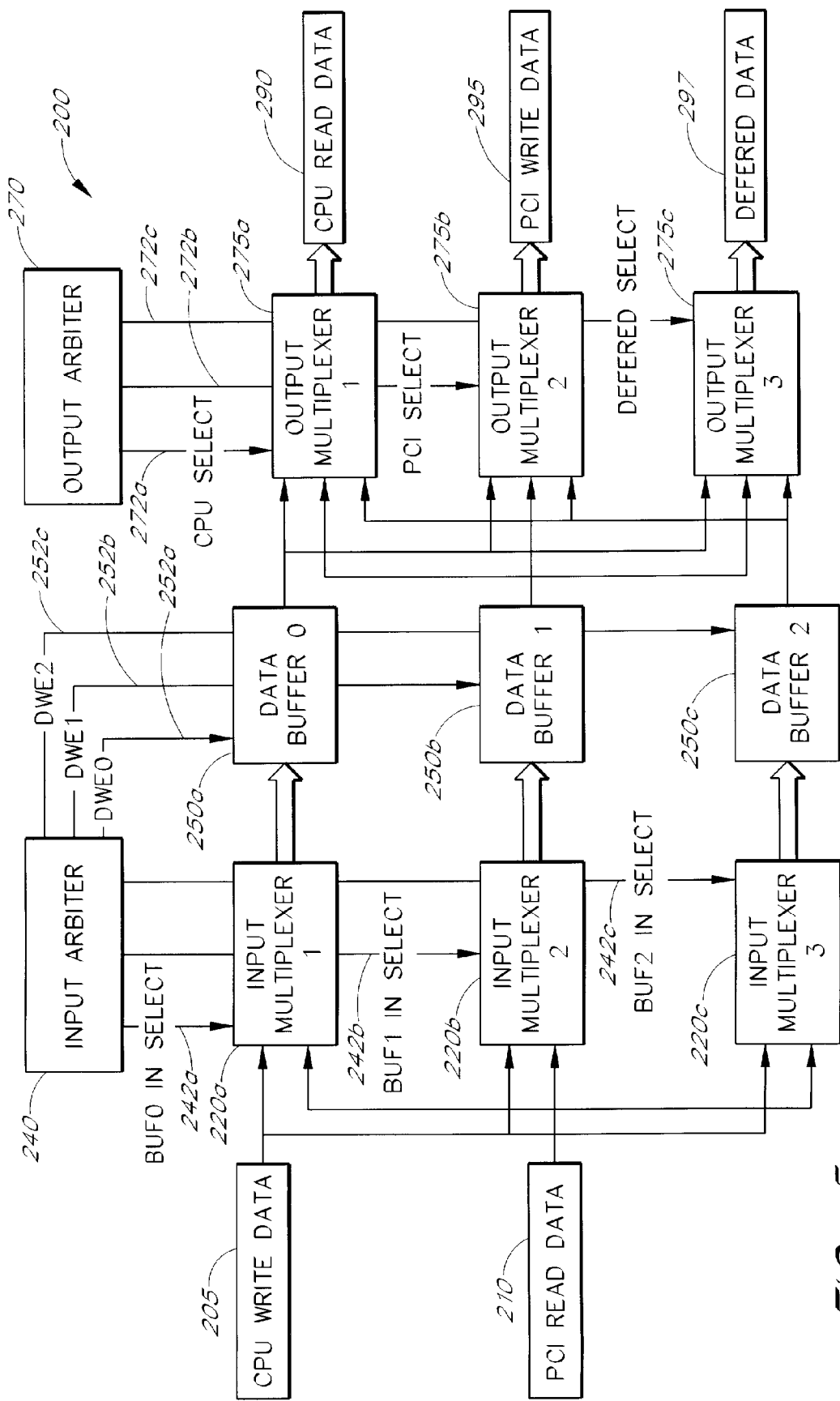
FIG. 5 is a block diagram of the data buffers that are part of the dynamic buffer allocation system shown in FIG. 3.

Referring now to FIG. 5, a block diagram of the dynamic buffer allocation system data buffers 200 is shown. The data buffers 200 may be used as illustrated in the embodiment shown in FIG. 5, to buffer data transfers between the Pentium processor 41 and PCI bus 43 that are requested by the address buffers 100. As shown, processor write data 205 or PCI read data 210 are inputs to the data buffer scheme 200. Processor write data 205 comes from the processor 41 and is destined for an address corresponding to a particular PCI device 44 on the PCI bus 43. PCI read data 210 is data that has been requested by the processor 41 and is now being sent from the PCI device 44 to the processor 41.

The processor write data 205 and PCI read data 210 act as inputs into a set of input multiplexers 220a–c. These multiplexers are under the control of an input arbiter 240 which uses buffer select signals 242a–c to select the correct one of the Input multiplexers 220 to accept the incoming data stream. This selection process is described more completely below in reference to FIG. 6. The input arbiter 240 acts as a selector, activating the proper input multiplexer 220a–c that should receive the incoming data stream based on the particular address buffer that first received the request. In addition, each input multiplexer 220a–c is linked to a single data buffer 250a–c, respectively. Thus, data that is multiplexed by the input multiplexer 220a is sent only to data buffer 250a, while data that is multiplexed by input multiplexer 220b is only sent to data buffer 250b.

As discussed above, the address buffers 115a–c and data buffers 250a–c work together as matched pairs so that, for example, requests placed in address buffer 115a (the first address buffer) will always have their data sent to the first data buffer 250a. The dynamic buffer allocation system address buffers 115a–c (FIG. 4) and dynamic buffer allocation system data buffers 250a–c (FIG. 5) work in unison through the signals and status bits outlined in Tables 1 and 3 so that an address request into a particular address buffer 115 will always be matched with its appropriate data in a matched data buffer 250. In one embodiment, address buffers 115a, 115b and 115c are matched with data buffers 250a, 250b and 250c, respectively.

The input arbiter 240 asserts write enable signals 252a–c to select when to move data from a particular input multiplexer 220 to its corresponding data buffer 250. Each data buffer can hold up to 255 bits (1 cache line) of data in the embodiment described in FIG. 5. However, it should be noted that data buffers having different capacities could be substituted without departing from the spirit of this invention. In addition, each buffer 250 has room for four sets of 8-bit byte enable data wherein each 8-bit byte enable data corresponds to a particular 64-bit segment of data in the buffer.

After data has been placed in one of the data buffers 250a–c, an output arbiter 270 may select an appropriate output multiplexer 275a–c based on the type of request associated with the data held in the data buffer. The data type can be determined by reference to the transfer type bit that is held in the matching address buffer. For example, the output arbiter 270 may provide a CPU select signal 272a to the output multiplexer 275a if the data is to be sent to the processor 41 via the Bus Slave Controller 55 as a piece of processor read data 290. Alternatively, the output arbiter 270 may provide a PCI select signal 272b to the output multiplexer 275b to send the data from a chosen data buffer to a particular PCI device as a piece of PCI write data 295. Finally, the output arbiter 270 may provide a deferred select signal 272c to the output multiplexer 275c to send deferred data 297 to the processor 41 via the Bus Master Controller 50 of the bridge circuit 40.

In one embodiment, the address/status buffers 115a–c provide the 32-bit addresses for data that are written into their matched data buffers 250a–c. In this manner, the DBA system 60 can match appropriate address requests with the returning data.

The specific signals used within the embodiments described in FIGS. 4–13 to control the data buffers 250a–c are described in Table 4.

TABLE 4

Signals used to Control the Data Buffers

| SIGNAL | DESCRIPTION |
|---|---|
| HS_READ_STROBE | Set by the DBA system to indicate to the bus slave controller that read data is ready. |
| HS_READ_BUSY | Cleared by the bus slave controller to accept data from the DBA system. |
| HS_WRITE_BUSY | Set by the DBA system to add wait states to processor to data buffer write. |
| HS_DONE | Set by the DBA system to indicate to the PCI control logic that a PCI cycle needs to begin. |
| HS_WRITE_STROBE | Set by the bus slave controller to transfer data to the DBA system. |
| HM_READ_STROBE | Set by the DBA system to indicate to the bus master controller that data transfer has been started. |
| HM_READ_BUSY | Set by the bus master controller to insert wait states into the DBA system on returning deferred data. |
| HM_DONE | Set by the bus master controller to signal the end of a transfer. |

TABLE 4-continued

Signals used to Control the Data Buffers

| SIGNAL | DESCRIPTION |
|---|---|
| PCI_REQ | Set by the DBA system to indicate to the PCI control logic that a PCI cycle needs to take place. |
| PCI_ACK | Set by the PCI control logic to acknowledge acceptance of the cycle. |
| PCI_DONE | Set by the PCI control logic to indicate that the PCI cycle is finished. |
| top_data_pr | Controls which data buffer processor data is directed to. |
| bottom_data_ptr | Controls which data buffer PCI data is directed to. |
| write_data_out_ptr | Controls which data buffer goes to the PCI interface. |
| read_data_out_ptr | Controls which data buffer goes to the bus slave controller interface. |
| defer_data_ptr | Controls which data buffer goes to the bus master controller interface. |

NOTE:
write_data_out_ptr = PCI_Select in FIG. 5.
read_data_out_ptr = processor_Select in FIG. 5.
defer_data_ptr = Deferred_Select in FIG. 5.

The input multiplexers 220a–c are controlled through several pointers, including top_data_ptr, bottom_data_ptr and status signals stored in the address buffers 115a–c. For example if the pointer top_data_ptr=1 and the transfer type buffer 1 indicates a processor-to-PCI write cycle, then a select signal 242a–c can be asserted to select a particular multiplexer 220a–c that will stroke data into a chosen data buffer 250a–c.

Control of the Address Buffers

Figure 6:
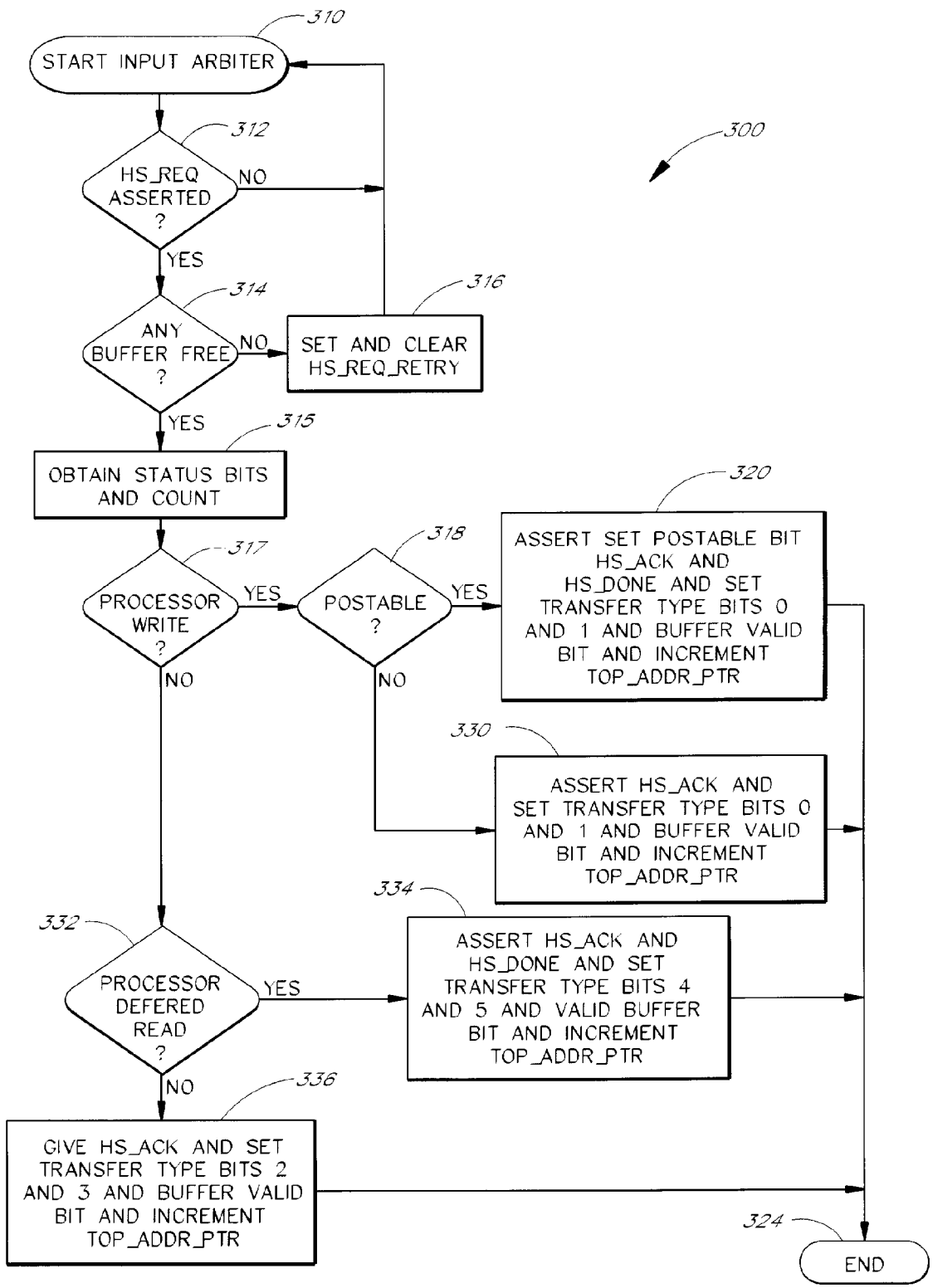
FIG. 6 is a flow diagram illustrating a process within the address buffer input arbiter shown in FIG. 4 to control a CPU request to send data to the PCI bus.

FIG. 6 provides a flow diagram illustrating a process 300 undertaken by address buffer input arbiter 130 (FIG. 4) to accept addresses into the address status buffers 115a–c from the CPU. The process 300 begins at a start state 310 wherein when the input arbiter 130 receives an address request 110 from the processor 41. The process 300 then moves to a decision state 312 wherein it inquires whether the HS_REQ signal has been asserted. As can be seen upon reference to Table 3, the HS_REQ signal is asserted to request an address transfer to the dynamic buffer allocation system 60 and indicates that a valid address and status bits are waiting on the processor bus 42.

If the HS_REQ signal is not asserted at decision state 312, then the process 300 returns to the start state 310 and continues looping until the HS_REQ signal is asserted. Once the HS_REQ signal is asserted at the decision state 312, the process 300 moves to a decision state 314 wherein the input arbiter 130 checks the status of each address buffer 115a–c to determine whether any buffer is available. If no buffers are free at the decision state 314, then the process 300 moves to state 316 wherein the HS_REQ_RETRY signal is set to indicate to the processor 41 that the address buffers 115 are full and the request should be retried later. The process 300 then loops to start state 310 and waits for an additional processor request.

If a determination is made at the decision state 314 that one of the address buffers 115a–c is available, then the process 300 obtains the address and valid bits from the address bus at a state 315. The process 300 then moves to a decision state 317 wherein a determination is made whether the address request is for a processor write. If a determination is made at the decision state 317 that the processor has requested at processor write, then the process 300 moves to a decision state 318 wherein the process 300 determines whether the processor write is postable.

As is known in the art, certain processor writes are designated as "postable" by being sent to pre-defined addresses. If the address request falls within a postable range, then it is handled in a different manner from other processor writes. Data that is sent to a postable address is assumed by the processor to have been received by its target, even before an actual acknowledgment is made from the target subsystem. Thus, the processor does not track these types of writes once they are sent to the target. For this reason, data that is sent to postable addresses on the PCI bus require that the DBA system 60 acknowledge their receipt by asserting a HS_DONE signal to indicate that the address has been received and the write process was completed.

If the processor write is found to be postable at decision state 318, then the process 300 moves to state 320 wherein receipt of the postable address is acknowledged by assertion of the HS_ACK signal, and completion of the PCI write is indicated to the processor by assertion of the HS_DONE signal. In addition, the transfer type bits 0 and 1 and the buffer valid bits are set at state 320 to indicate that the designated request is for a processor write. Once the signals HS_ACK and HS_DONE are asserted, and the transfer type bits 0 and 1 and buffer valid bits are set at the state 320, the pointer top_addr_ptr is incremented so that it points to the next address buffer to be filled. As indicated in Table 3, the HS_ACK signal is set by the dynamic buffer allocation system 60 to notify the CPU Bus slave controller 55 that the requested transfer from the processor 41 has been accepted. The process 300 then completes by moving to an end state 324.

However, if a determination is made at the decision state 318 that the processor write is not postable, then the process 300 moves to a state 330 wherein the HS_ACK signal is asserted and transfer type bits 0 and 1 and the buffer valid bits are set. In addition, the top_addr_ptr pointer is incremented to point to the next address buffer that will be available to accept an address in the dynamic buffer allocation system 60.

If a processor write was not being performed at the decision state 317, then the process 300 moves to a decision state 332 wherein a determination is made whether or not a processor deferred read is being requested. If a determination is made at the decision state 332 that the processor has requested a deferred read, then the process 300 asserts the HS_ACK and HS_DONE signals at a state 334 and additionally sets the transfer type bits 4 and 5 and valid buffer bits. As can be seen upon reference to Table 1, the setting the transfer type bits 4 and 5 indicates to the DBA system 60 that the processor has requested a deferred read.

In addition, the top_addr_ptr pointer is incremented at state 334 to point to the next available address buffer in the DBA system 60. Once the process 300 has completed asserting the aforementioned signals at state 334 it completes at the end state 324.

If a determination is made at the decision state 332 that the processor request is not for a deferred read, then the process 300 moves to state 336 wherein it assumes that the processor has requested a read procedure and therefore asserts the HS_ACK signal and sets the transfer type bits 2 and 3 and buffer valid bits. In addition, the top_addr_ptr pointer is incremented to point to the next available address buffer 115a–c in the dynamic buffer allocation system 60. The process 300 then moves to end state 324 wherein it completes.

Figure 7:
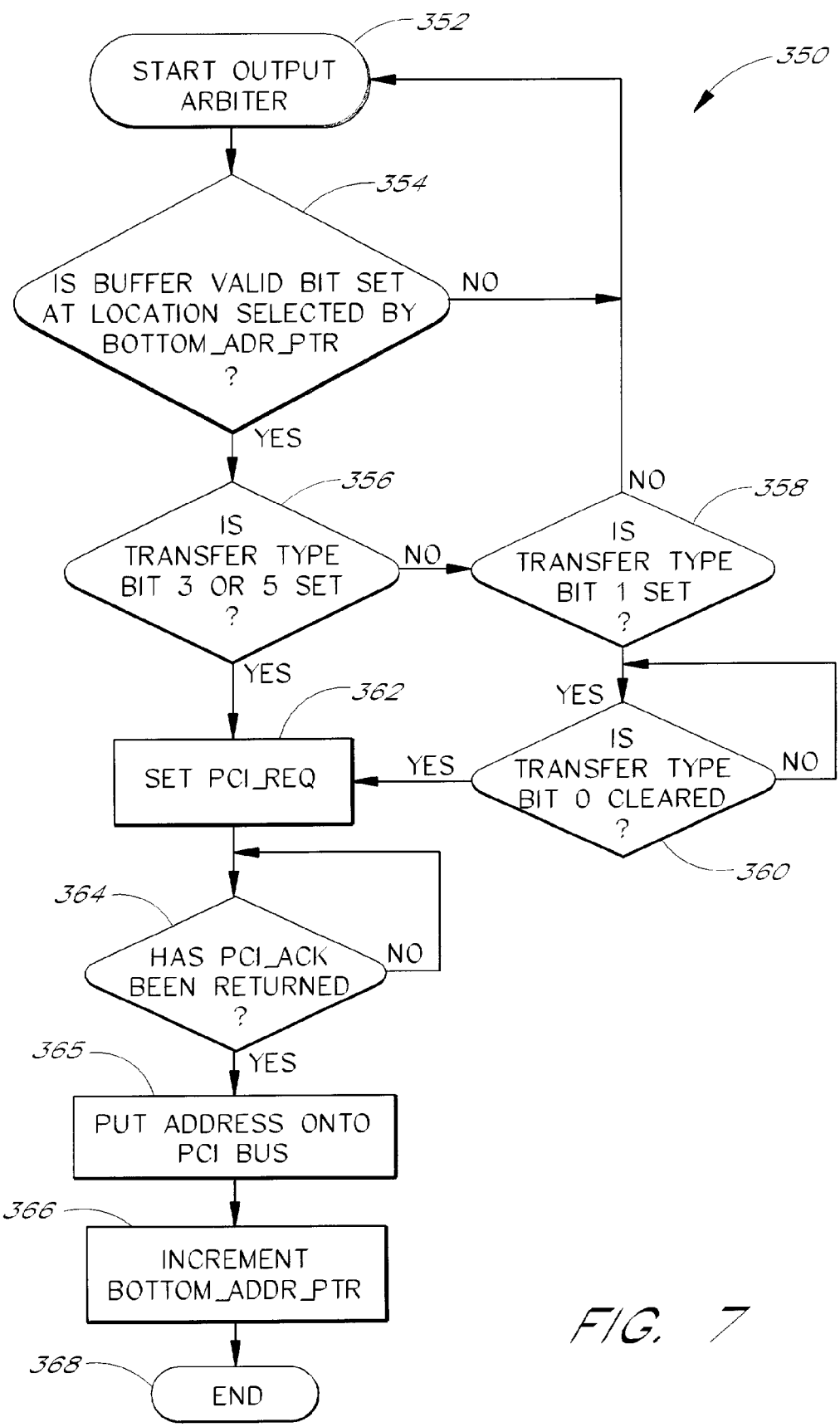
FIG. 7 is a flow diagram illustrating a process within the address buffer output arbiter shown in FIG. 4 to send a PCI address to the PCI bus.

FIG. 7 is a flow diagram illustrating the process 350 that the address buffer output arbiter 135 undertakes to output a PCI address through the output multiplexer 140 (FIG. 4). The process 350 begins at a start state 352 and moves to a decision state 354 wherein a determination is made whether the buffer valid bit is set at the location selected by the bottom_addr_ptr pointer. As discussed above, the buffer valid bit indicates that the current address buffer contains a valid address. Thus, when the bottom_addr_ptr pointer points towards a particular address, a determination needs to be made whether the address within that buffer is valid.

If the buffer valid bit is not set at decision state 354, then the process 350 loops back to the start state 352. However, if the buffer valid bit is set at the location selected by the bottom_addr_ptr, then the process 350 moves to a decision state 356 wherein a determination is made whether the transfer type bits 3 or 5 are set. As indicated in Table 1, transfer type bits 3 and 5 indicate that a PCI read was requested by the processor 41.

If the transfer type bits 3 or 5 are not set, then the process 350 moves to a decision state 358 wherein a determination is made whether the transfer type bit 1 has been set, thus indicating that the processor 41 has requested a write to a device on the PCI bus 43. As indicated in Table 1, transfer type bit 1 is set when an initiator, in this case the processor 41, has requested a PCI write cycle. Transfer type bit 1 is cleared when all of the PCI write data from the data buffers 250a–c (FIG. 5) has been sent to the PCI bus. If transfer type bit 1 is not set at decision state 358 then the process 350 moves back to start state 352.

If transfer type bit 1 is set at the decision state 358, then the process 350 moves to a decision state 360 to determine whether the transfer type bit 0 has been cleared. As indicated in Table 1, the transfer type bit 0 is used to indicate that a processor write has begun such that data is written to the address buffer's matched data buffer. Thus, at this point in the process, the processor has requested a processor write to a particular address. The address buffer selected by the top_addr_pointer has accepted the address, and the processor is starting to fill the corresponding matched data buffer with data that is destined for the PCI bus. Once the processor has finished writing data to the matched data buffer, the transfer type bit 0 will be cleared in the address buffer.

Once transfer type bit 0 has cleared, the address buffer output arbiter 135 determines that data has been completely written to the data buffer. If the transfer type bit 0 has not been cleared at the decision state 360, then the process 350 loops until the transfer type bit 0 is cleared, indicating that the processor has completed writing data to the matched data buffer. Once a determination is made at the decision state 360 that the transfer type bit 0 has been cleared, the process 350 asserts a PCI_REQ signal at a state 362. As shown in Table 3, the PCI_REQ signal is set to indicate to the PCI bit control logic that the dynamic buffer allocation system 60 requires a PCI bus cycle in order to transfer data from the matched data buffer to the PCI bus.

If the processor has made a read request by setting transfer type bits 3 or 5 at decision state 356, then the process 350 moves directly to state 362 wherein the PCI_REQ signal is asserted to request a PCI bus cycle.

Once the PCI_REQ signal is asserted at state 362 to request a PCI bus cycle, the process 350 moves to a decision state 364 to determine whether a PCI_ACK signal has been returned from the PCI bus. The PCI_ACK signal indicates that the PCI bus has a clock cycle available to accept an address from the address buffer that is currently being pointed to by the top_addr_ptr pointer. If the PCI_ACK signal has not been returned at decision state 364, then the process 350 loops until the acknowledgement signal is returned.

Once the PCI_ACK signal is returned at decision state 364, the address is placed on the PCI bus at a state 365. The process 350 then moves to a state 366 and increments the bottom_addr_ptr pointer to indicate the next address buffer to be acted upon in the dynamic buffer allocation system 60. The process 350 then completes at an end state 368.

Figure 8:
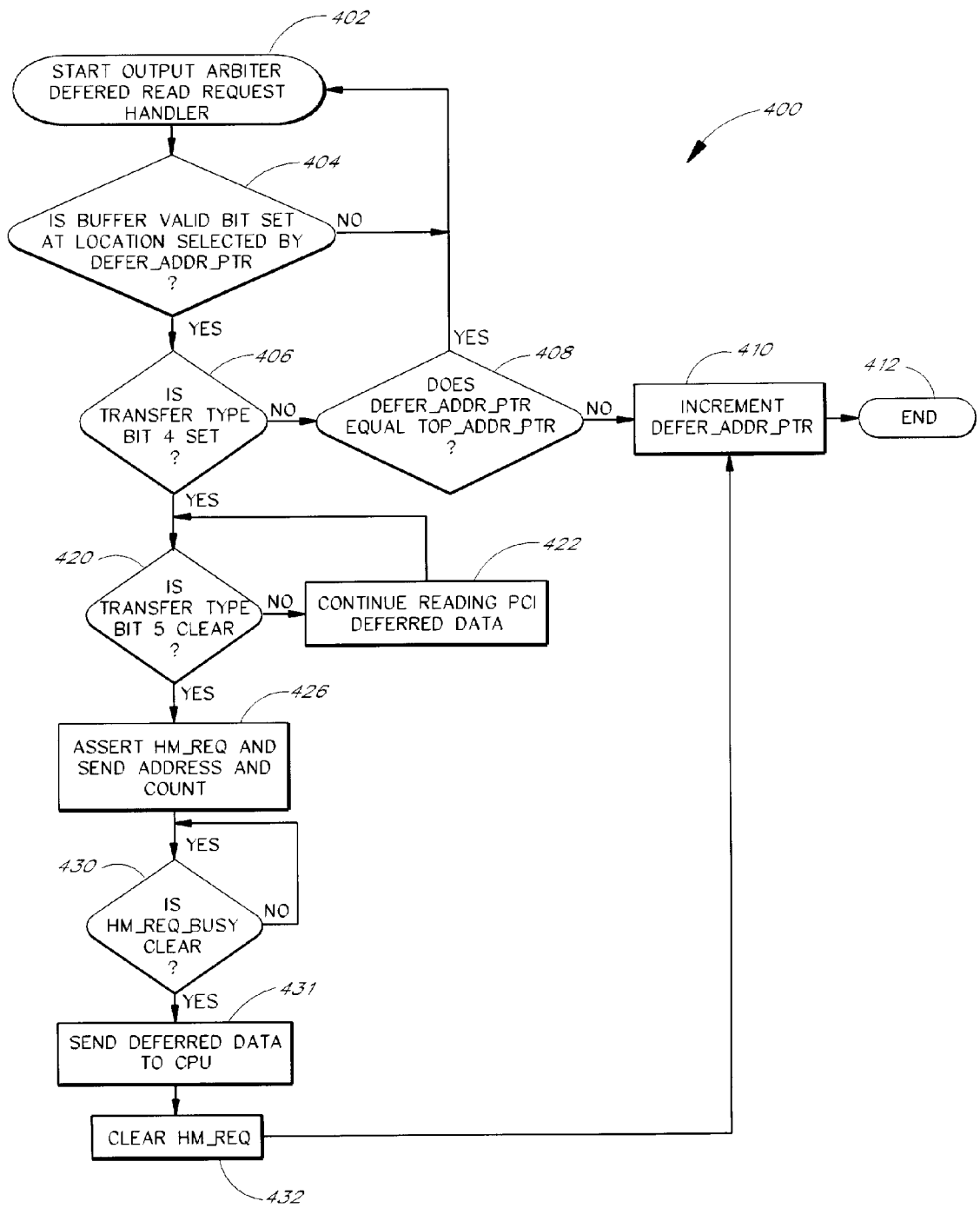
FIG. 8 is a flow diagram illustrating a process within the address buffer output arbiter shown in FIG. 4 to read deferred data from a PCI device.

FIG. 8 is a flow diagram illustrating the process undertaken by the address buffer output arbiter 135 to send a deferred address request from the output multiplexer 145 to the processor bus master controller 50. The process 400 begins at a start state 402 wherein the output arbiter begins handling a deferred read request from the processor 41. The process 400 then moves to a decision state 404 wherein a determination is made as to whether the buffer valid bit has been set at the location currently selected by the defer_addr_ptr pointer. As discussed above, the buffer valid bit indicates that the address currently held in the address buffer is valid and that the processor 41 has completed latching the address information into one of the address buffers 115. In addition, the defer_addr_ptr points to the oldest unfinished address buffer that contains a deferred address request from the processor.

If the buffer valid bit has not been set for the location currently selected by the defer_addr_ptr pointer, then the process 400 loops to start state 402. However, if the buffer valid bit is set at the decision state 404, then the process 400 determines whether the transfer type bit 4 has been set at a decision state 406. Transfer type bit 4 indicates that the address in the address buffer part of a deferred read cycle (Table 1). If the transfer type bit 4 has not been set at decision state 406, then the process 400 moves to a decision state 408 to determine whether the defer_addr_ptr pointer is equal to the top_addr_ptr pointer. If the defer_addr_ptr=top_addr_ptr at decision state 480, the process 400 loops back to the start state 402.

As illustrated in FIG. 8, the process 400 loops from state 402 through decision states 404, 406 and 408 until all of the deferred transactions have been processed. Because it is important to maintain the order of reads and writes on the PCI bus, this loop is used to assure that if the defer_addr_ptr pointer points to the same buffer as the top_addr_ptr pointer, then every buffer between the defer_addr_ptr pointer and the top_addr_ptr will have a valid bit set. Thus, the process 400 will always reach decision state 406 to determine whether the transfer type bit 4 has been set, indicating a deferred transfer. Once the defer_addr_ptr pointer is equal to the top_addr_ptr pointer it is known that no more deferred cycles are pending.

If the defer_addr_ptr does not equal the top_addr_ptr at the decision state 408 then the process 400 increments the defer_addr_ptr pointer at state 410 and completes at an end state 412. In this embodiment, the dynamic buffer allocation system 60 can search for the next address buffer that contains a deferred read request by incrementing the defer_addr_ptr pointer when the transfer type bit 4 is not set.

If the process 400 determines at the decision state 406 that the transfer type bit 4 has been set, thus indicating the address is part of a deferred read request, an inquiry is made at a decision state 420 whether the transfer type bit 5 has cleared. As indicated in Table 1, clearing the transfer type bit 5 indicates to the system that the PCI bus has finished returning the requested data for the PCI read into the matched data buffer 250. If the transfer type bit 5 has not been cleared at the decision state 420, then the process continues to wait for deferred read data from the target device on the PCI bus at a state 422. The process 400 then loops to the decision state 420 to determine whether the matched data buffer has completed its deferred read from the PCI bus and cleared the transfer type bit 5.

Once the transfer type bit 5 has been cleared, the process 400 moves to state 426 wherein the HM_REQ signal is asserted to request a deferred data transfer from the matched data buffer to the processor. In addition, the processor address and total file count size is sent to the processor.

The process 400 then moves to a decision state 430 wherein an inquiry is made whether the HM_REQ_BUSY signal is asserted by the processor. As is known, data can be transferred from the CPU Bus controller 50 master to the processor when the HM_REQ signal is asserted and the HM_REQ_BUSY signal is clear. If a determination is made at decision state 430 that the HM_REQ_BUSY signal is not clear, then the process 400 loops until the signal has cleared. Once the HM_REQ_BUSY signal has cleared, the DBA system can transfer the deferred data from the matched data buffer to the processor as described below with reference to process 650 of FIG. 13.

The process 400 then moves to state 432 wherein the HM_REQ signal is cleared to indicate that the CPU Bus master controller 50 is now free to accept another data request. The process 400 then moves to the state 410 and increments the defer_addr_ptr pointer to indicate the next address buffer which should be checked to determine whether it contains a deferred address request (eg: transfer type bit 4). The process 400 then ends at the end state 412.

Control of the Data Buffers

Figure 9:
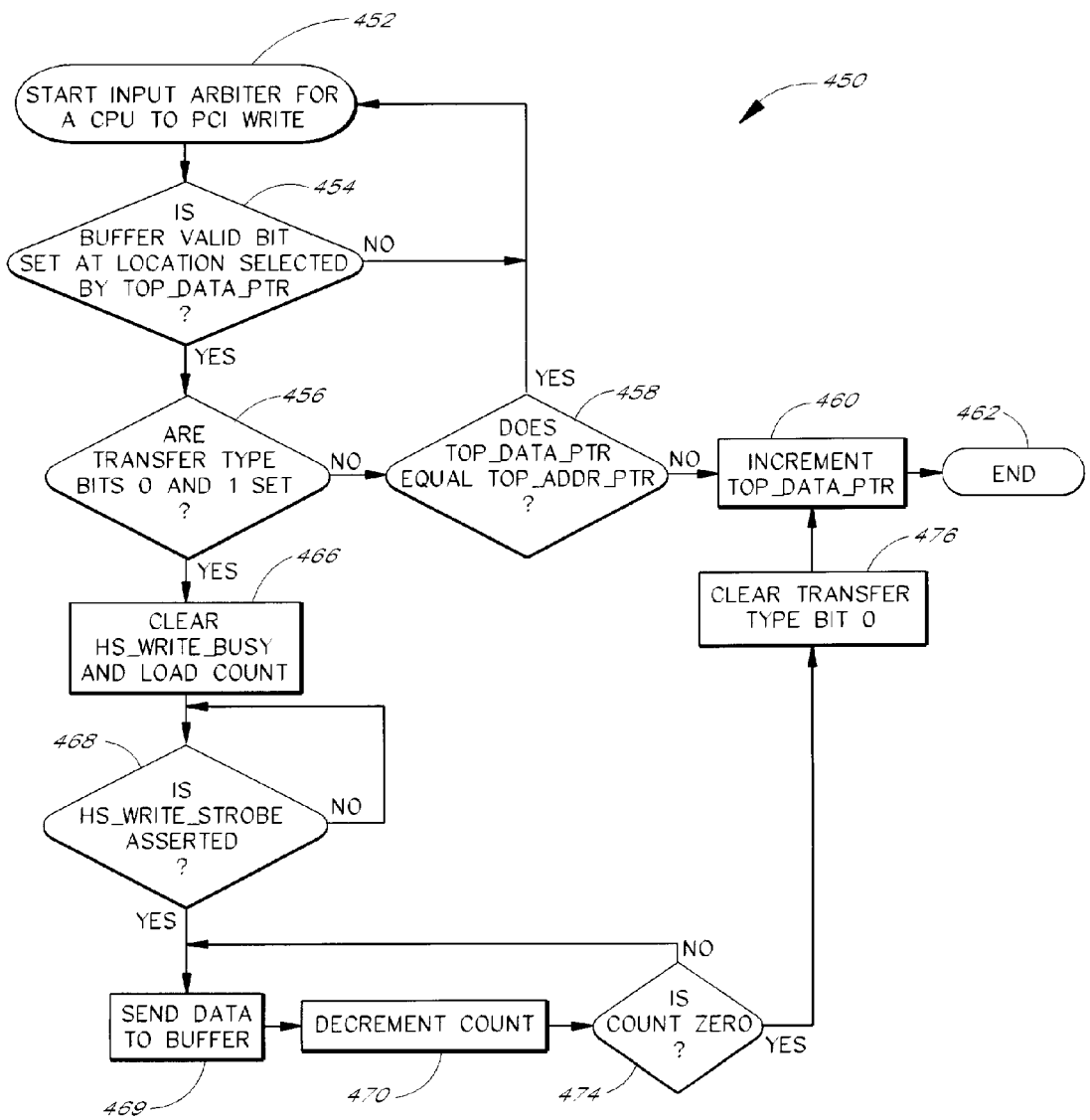
FIG. 9 is a flow diagram illustrating a process within the data buffer input arbiter shown in FIG. 5 to control CPU write data that is destined for a PCI device.

FIG. 9 is a flow diagram illustrating the process undertaken by the data buffer input arbiter 240 to write processor data 205 to a device on the PCI bus. The process 450 begins at a start state 452 wherein the data buffer input arbiter 240 receives a processor-to-PCI write request from the processor 41. The process 450 then moves to a decision state 454 wherein a determination is made whether the buffer valid bit is set at the location selected by the top_data_ptr pointer. As can be seen upon reference to Table 4, the top_data_ptr pointer tracks which data buffer should receive data for a particular matched address buffer. If the buffer valid bit is not set at the location pointed to by the top_data_ptr pointer then the process 450 loops back to start state 452 until the buffer valid bit is set.

Once the buffer valid bit is set at the location selected by the top_data_ptr pointer, the process 450 determines whether the transfer type bits 0 and 1 have been set in the corresponding matched address buffer at a decision state 454. If transfer type bits 0 and 1 are not set in the matched address buffer, the process 450 moves to a decision state 458 to determine whether the top_data_ptr pointer equals the top_addr_ptr pointer. If these pointers are equal at decision state 458 then the process 450 returns to start state 452.

However, if the top_data_ptr pointer does not equal the top_addr_ptr pointer at the decision state 458, then the process 450 moves to state 460 wherein the top_data_ptr pointer is incremented. Once the top_data_ptr pointer has been incremented to point to the next available data buffer, the process 450 completes at an end state 462.

If the transfer type bits 0 and 1 were found to be set at the decision state 456, then the process 450 clears the HS_WRITE_BUSY signal at a state 466 and loads a count of the number of bytes to send from the processor 41 to the target device. The process 450 then moves to a decision state 468 and determines whether the HS_WRITE_STROBE signal has been asserted. When the HS_WRITE_BUSY signal is clear and the HS_WRITE_STROBE is asserted, then data is being transferred from the processor to the data buffer pointed to by the top_data_ptr pointer.

If a determination is made that the HS_WRITE_STROBE is not asserted at the decision state 468, then the process 450 loops until the signal is asserted. Once the HS_WRITE_STROBE signal has been asserted, thus indicating that data can be sent to the data buffer, at the decision state 468, the process 450 sends data to the matched data buffer at a state 469. The byte count of the data that was sent to the data buffer at state 469 is then decremented in a state 470 from the total number of data bytes coming from the processor. A determination is then made at a decision state 474 whether the byte count of the file coming from the processor has reached zero. If the count has not reached zero, then the process 450 loops back to state 469 wherein more pieces of data are sent to the matched data buffer.

However, if the count has reached zero at decision state 474, then the process 450 clears the transfer type bit zero at a state 476 and increments the top_data_ptr pointer at the state 460 to point to the next data buffer that is to accept data. As indicated in Table 1, clearing the transfer type bit zero indicates to the dynamic buffer allocation system that the processor has completed sending the PCI write data to the designated buffer. The process then completes at end state 462.

Figure 10B:
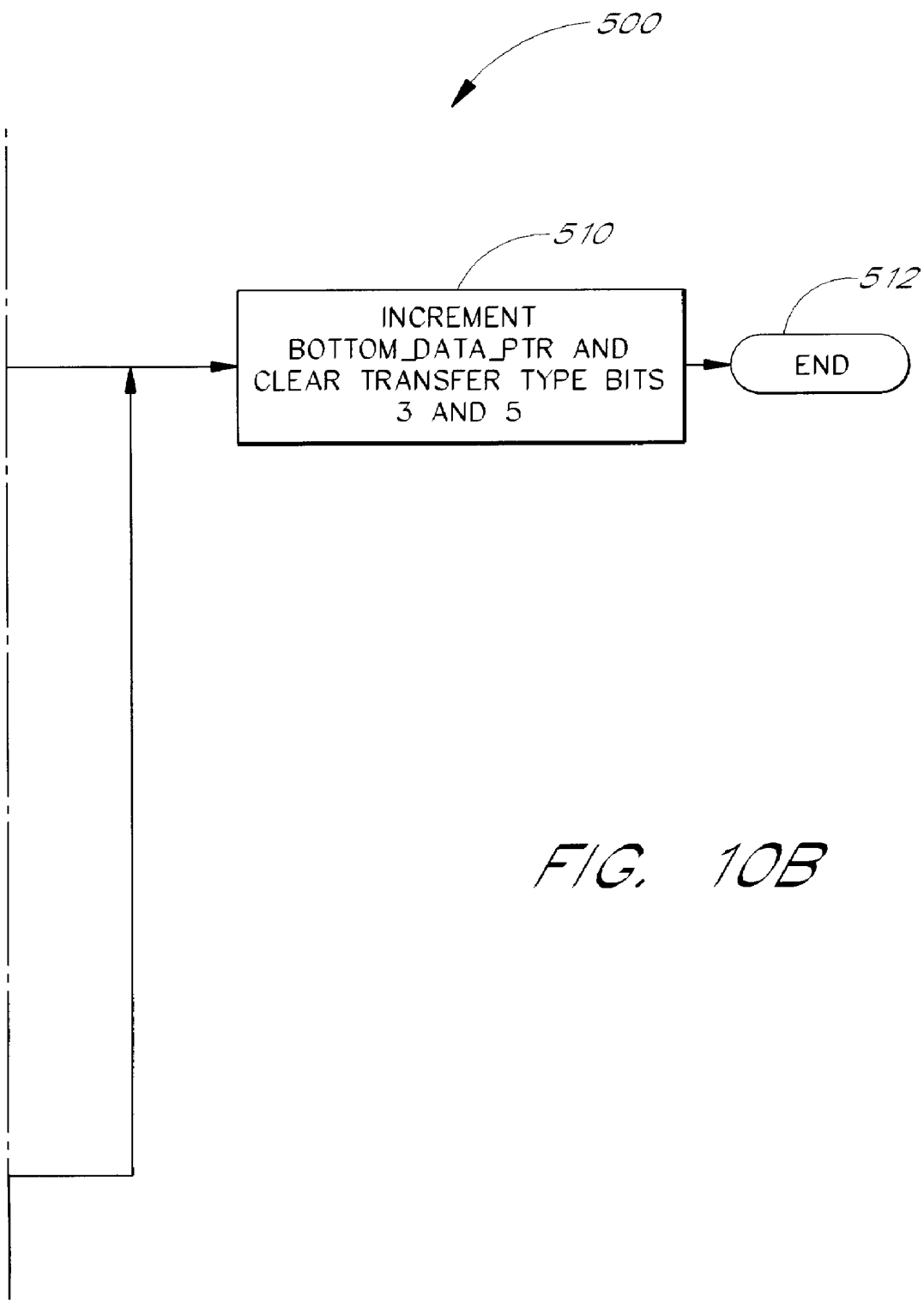
FIG. 10 is a flow diagram illustrating a process within the data buffer input arbiter shown in FIG. 5 to control a PCI read request from the CPU.

FIG. 10 is a flow diagram describing the process that the data buffer input arbiter 240 undergoes to manage PCI read data 210 (FIG. 5) as it is being input into the data buffers 250a–c. The process 500 begins at a start state 502 wherein incoming PCI read data is sent to the data buffers 200 from a PCI device 44. The process 500 then moves to a decision state 504 wherein a determination is made whether the buffer valid bit is set at the location selected by the bottom_data_ptr pointer.

If the buffer valid bit is not set at the decision state 504, then the process returns to the start state 502. However, if the buffer valid bit is set at the decision state 504, the process 500 moves to a decision state 506 wherein a determination is made whether the transfer type bits 2 and 3 or the transfer type bits 4 or 5 are set. As described in reference to Table 1, transfer type bits 2 and 3 indicate that the matched address buffer holds an address for a processor and PCI read request whereas transfer type bits 4 and 5 indicate that the address request in the address buffer is for a deferred read request.

If transfer type bits 2 and 3 or transfer type bits 4 and 5 are not set at the decision state 506, then the process 500 moves to a decision state 508 wherein a determination is made whether the buffer valid bit is set for the location selected by the bottom_data_ptr pointer. If the buffer valid bit is set at the location selected by the bottom_data_ptr pointer then the process loops until the buffer valid bit is not set. Once it is determined at decision state 508 that the buffer valid bit is no longer set, the process 500 increments the bottom_data_ptr pointer at a state 510 to move the pointer to the next data buffer to analyze. In addition, the transfer type bits 3 and 5 are cleared at state 510 to indicate that process of reading (or deferred reading) data from a PCI device has been completed. The process 500 then ends at an end state 512.

If the transfer type bits 2 and 3 or the transfer type bits 4 and 5 were set at the decision state 506, then the process 500 moves to state 520 and begins accepting writes from the PCI bus to the buffer selected by the bottom_data_ptr pointer. In addition, writes to the matched address buffer are enabled and the count is loaded into a memory. The process 500 then moves to decision state 522 wherein a determination is made whether the byte count of the file being sent to the data buffer has reached zero.

If the count is not zero, then the process 500 moves to a decision state 524 and determines whether a PCI write enable signal has been returned from the PCI bus. If a PCI write enable signal has been returned from the PCI bus as determined at decision state 524, then the process 500 moves to state 530 and decrements the byte counter and increments writes from the PCI bus to the next logical address in the cache line buffer. The process 500 increments writes from the PCI bus if the count is greater than zero during a processor to PCI read cycle because more than one data phase will occur on the PCI bus. Thus, the double word (DWORD) of the data buffer that is being written to will need to be incremented to select the next DWORD in the cache line for each consecutive PCI data phase. The process 500 then determines whether the PCI_DONE signal has been returned from the PCI bus control logic at a decision state 532.

If the count is found to be zero at decision state 522 then the process 500 moves directly to the decision state 532 to determine whether the PCI_DONE signal has been returned. Similarly, if it is determined in the decision state 524 that a PCI write enable signal has not been, then the process 500 moves to decision state 532 to determine whether the PCI_DONE signal has been returned.

If it is found in decision state 532 that the PCI_DONE signal has not been, then the process 500 loops to decision state 522 to determine whether the count is zero. As is discussed in reference to Table 4, the PCI_DONE signal indicates that the PCI bus control logic has completed writing all of the data from the PCI bus to the designated data buffer. However, if the PCI_DONE signal has been returned, thus indicating that the data buffer has a complete copy of the data requested by the processor, the process 500 moves to state 510 wherein the bottom_data_ptr pointer is incremented and transfer type bits 3 and 5 are cleared. The process 500 then concludes at the end state 512.

Figure 11:
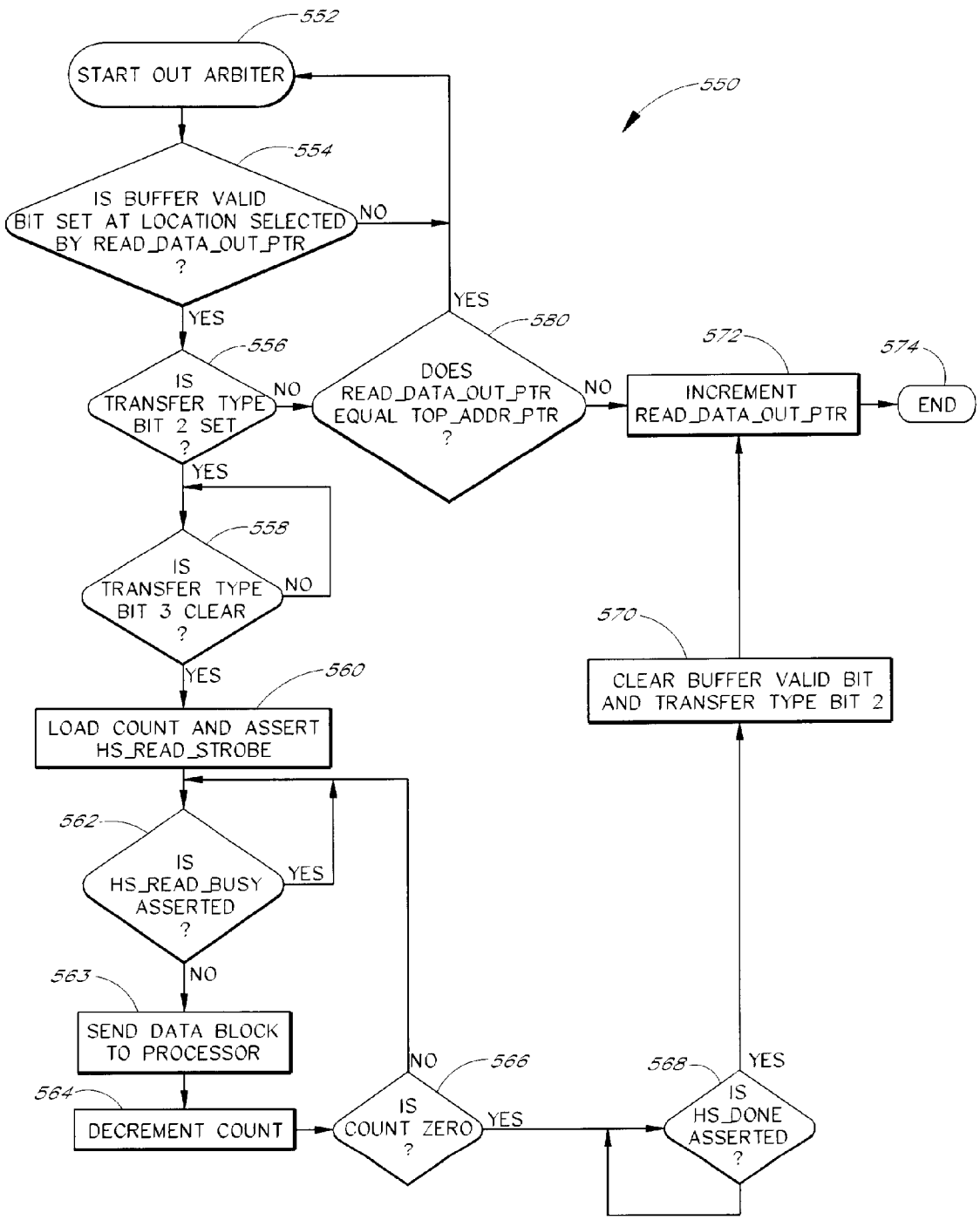
FIG. 11 is a flow diagram illustrating a process within the data buffer output arbiter shown in FIG. 5 to control CPU read data that is sent to the PCI bus.

FIG. 11 describes the process 550 that the data buffer output arbiter 270 undergoes to coordinate sending data that is stored in a data buffer to the processor. The process 550 begins at a start state 552 and then moves to a decision state 554 wherein a determination is made whether the buffer valid bit has been set at the location selected by the read_data_out_ptr pointer. If the buffer valid bit has not been set at the location selected by the read_data_out_ptr pointer at the decision state 554, then the process 550 loops to the start state 552. However, if the buffer valid bit has been set at the decision state 554, then the process 550 moves to decision state 556 and determines whether transfer type bit 2 has been set. As can be seen upon reference to Table 1, the transfer type bit 2 is set when data is being sent from the data buffer back to the processor as part of a CPU read cycle.

If transfer type bit 2 has been set at the decision state 556, then the process 550 moves to decision state 558 wherein a determination is made whether the transfer type bit 3 is clear. The transfer type bit 3 is cleared when all of the data from the selected PCI device has been sent to the specified data buffer. If the transfer type bit 3 is not clear at the decision state 558 then the process 550 loops until it becomes clear. Once the transfer type bit 3 becomes clear at the decision state 558, then the process 550 moves to state 560, loads the byte count, and asserts the HS_READ_STROBE signal.

Once the HS_READ_STROBE signal has been asserted at state 560 to indicate to the CPU Bus master controller 50 that data is ready to be sent to the processor, the process moves to decision state 562 to determine whether the HS_READ_BUSY signal has been asserted. If this signal has been asserted at the decision state 562 then the process 550 continues to loop until the HS_READ_BUSY signal is no longer asserted. Once the signal has been determined to not be asserted at the decision state 562, then the process sends a data block to the processor at a state 563. The process 550 then moves to state 564 wherein the counter is decremented by the number of bytes sent to the processor in state 563. The process 550 then moves to a decision state 566 to determine whether the byte count has become zero, thus indicating that the entire file has been sent from the data buffer to the processor. If the count is not zero at the decision state 566, then the process 550 moves to decision state 562 to determine whether the HS_READ_BUSY signal has been asserted.

However, if the count is determined to be zero at the decision state 566, then the process 550 moves to decision state 568 to determine whether the HS_DONE signal has been asserted. As can be seen upon reference to Table 3, assertion of the HS_DONE signal indicates that a read transfer from the CPU Bus Slave Controller 55 to the processor has been completed. If the HS_DONE signal has not been asserted at the decision state 568, then the process loops until it becomes asserted.

Once the HS_DONE signal is asserted at the decision state 568, indicating that the read data from the PCI bus has been sent to the processor, the process 550 moves to state 570 and clears the buffer valid bit and transfer type 2 bit. By clearing these bits, the process 550 makes the current buffer available to receive additional sets of data. The process 550 then moves to a state 572 wherein the read_data_out_ptr pointer is incremented. The process then ends at an end state 574.

If the transfer type bit 2 was not set at the decision state 556, then the process 550 moves to a decision state 580 in order to determine whether the read_data_out_ptr pointer is equal to the top_addr_ptr pointer. If these pointers are equal at decision state 580, then the process loops to start state 552. However, if the read_data_out_ptr pointer does not equal the top_addr_ptr pointer at the decision state 580, then the process 550 moves to state 572 wherein the read_data_out_ptr pointer is incremented and the process then ends at the end state 574.

Figure 12:
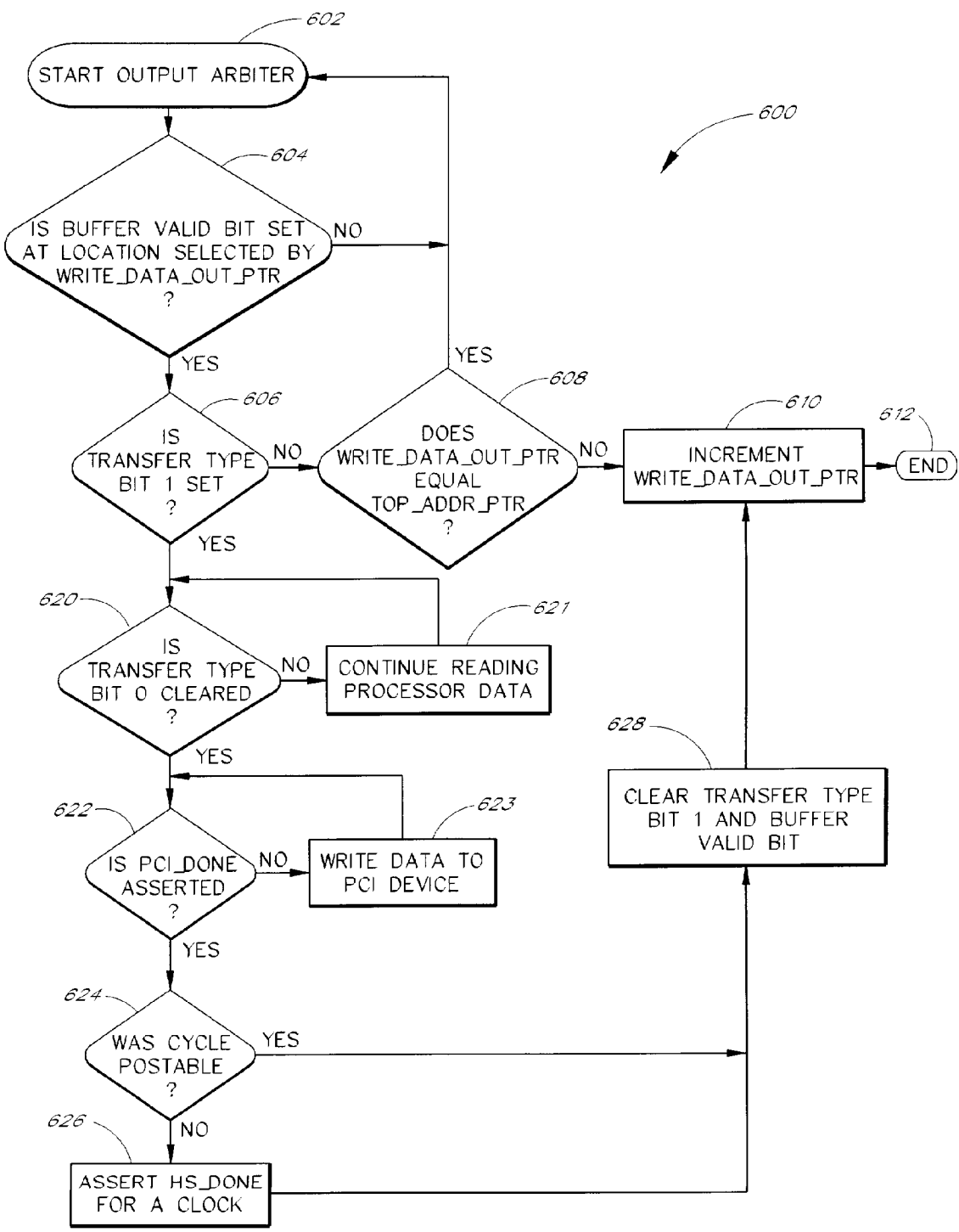
FIG. 12 is a flow diagram illustrating a process within the data buffer output arbiter shown in FIG. 5 to control write data that is to be sent to a PCI device.

FIG. 12 describes a process 600 that the output arbiter 270 undertakes to output PCI write data 295 from an output multiplexer 275B. The process 600 begins at a start state 602 and then moves to a decision state 604 wherein a determination is made whether the buffer valid bit was set at the location selected by the write_data_out_ptr pointer. If the buffer valid bit was not set, then the process loops back to the start state 602.

However, if the buffer valid bit was determined to have been set in the decision state 604, then the process 600 moves to a decision state 606 and determines whether the transfer type bit 1 is set. As can be seen upon reference to Table 1, the transfer type bit 1 indicates that the processor has requested a PCI write. If the transfer type bit 1 is not set, then the process 600 moves to a decision state 608 to determine whether the write_data_out_ptr pointer is equal to the top_addr_ptr pointer. If these pointers are equal, then the process 600 moves back to start state 602. However, if the pointers are not equal, then the process 600 moves to state 610 wherein the write_data_out_ptr pointer is incremented. The process 600 then completes at an end state 612.

If the transfer type bit 1 was determined to have been set in the decision state 606, indicating that the processor has requested a PCI write, then the process 600 moves to a decision state 620 to determine whether the transfer type bit 0 has cleared. As indicated in Table 1, the transfer type bit 1 indicates a processor write has been initiated to the data buffer. Once the processor has completed writing data to the data buffer, the transfer type bit 0 is cleared from the matched address buffer.

If the transfer type bit 0 is not cleared at decision state 620, then the process 600 moves to state 621 and continues reading processor data. The process 600 then loops back to the decision state 620 to determine whether the transfer type bit 0 has cleared. Once the transfer type bit 0 has cleared, indicating that all of the processor data has been sent to the data buffer, the process 600 determines whether the PCI_DONE signal has been asserted at a state 622. As can be seen upon reference to Table 4, the PCI_DONE signal is asserted when a data transfer from the data buffers to the PCI bus has been completed. Thus, if the PCI_DONE signal is not asserted at decision state 622, then the process 600 moves to state 623 and continues writing data to the target PCI device. As data is being written to a PCI device at state 623, the process 600 will continue to check for the PCI_DONE signal at the decision state 622.

Once the PCI_DONE signal is detected as having been asserted at the decision state 622, the process 600 moves to a decision state 624 to determine whether the PCI write cycle was postable. As discussed above, a postable write is one wherein the processor relinquishes control of the write as soon as it is sent from the processor. The processor does not wait to receive an acknowledgment that the write cycle has completed. If the PCI write cycle was not postable, then the process 600 moves to state 626 wherein the HS_DONE signal is asserted for one clock cycle. The process 600 then moves to state 628 wherein the transfer type bit 1 and buffer valid bit are cleared so that buffer is available to receive a new set of data.

If a determination is made at the decision state 624 that the process was postable, then the process 600 moves to the state 628 and the transfer type bit 1 and buffer valid bit are cleared without assertion of the HS_DONE signal. As shown in FIG. 6, the HS_DONE signal for postable writes is asserted at state 320. Therefore it is not necessary to assert it again once the postable write is finally sent to a PCI device.

Figure 13:
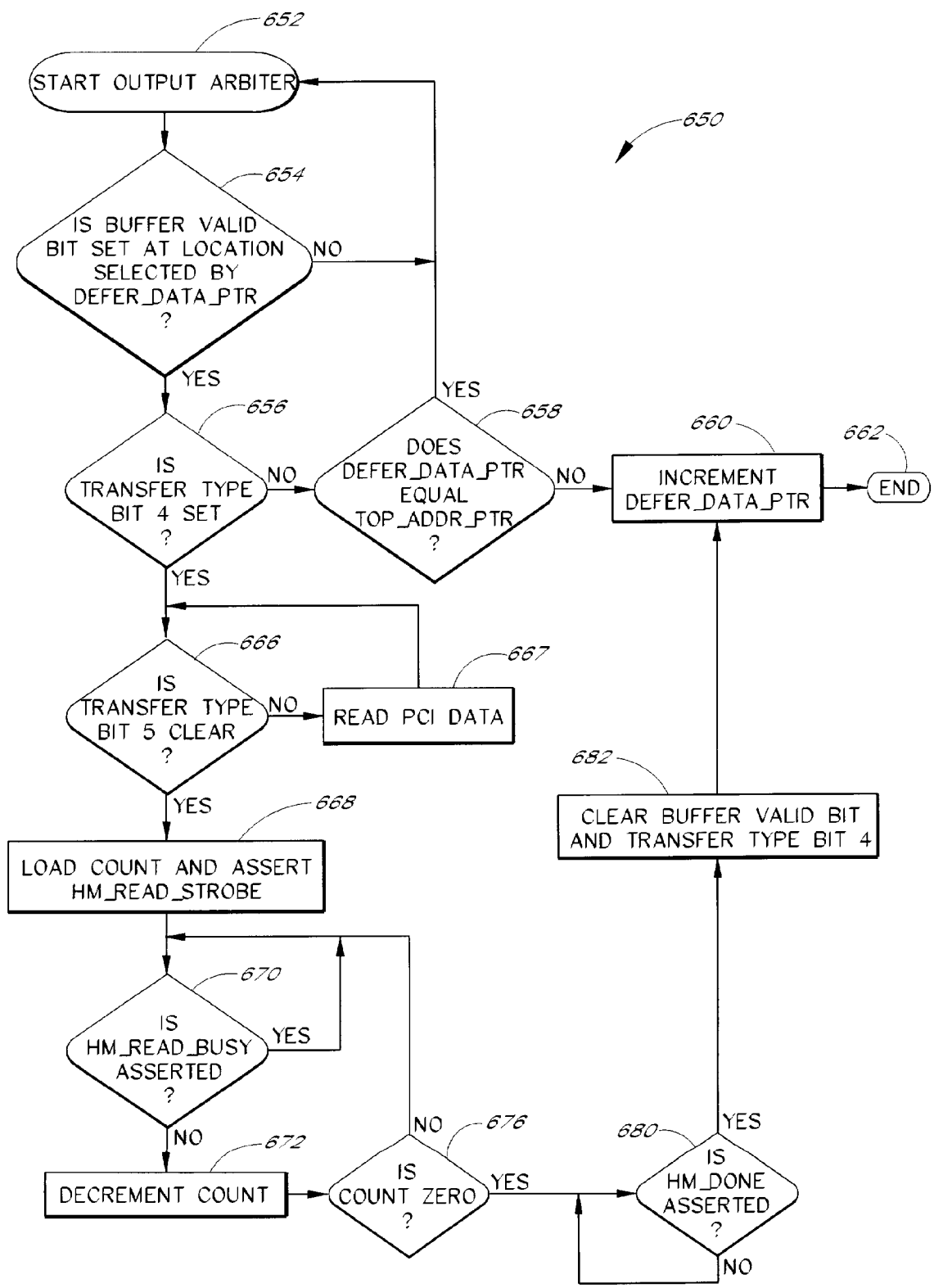
FIG. 13 is a flow diagram illustrating a process within the data buffer output arbiter shown in FIG. 5 to control deferred data that is to be returned from a PCI device to the CPU.

FIG. 13 provides a description of a process 650 by which the data buffer output arbiter 270 sends out deferred data 297 through the output multiplexer 275 (FIG. 5). The process 650 begins at a start state 652 and then moves to a decision state 654 wherein a determination is made whether the buffer valid bit is set at the location selected by the defer_data_ptr pointer. If the buffer valid bit is not set at this location, then the process 650 returns to start state 652 and waits for valid data to arrive. However, if the buffer valid bit is set at the decision state 654, then the process 650 moves to decision state 656 and determines whether the transfer type bit 4 has been set at a decision state 656. As can be seen upon reference to Table 1, the transfer type bit 4 indicates that the processor has requested a processor deferred read.

If transfer type bit 4 is not set at the decision state 656, then the process 650 moves to decision state 658 and determines whether the defer_data_ptr pointer is equal to the top_addr_ptr pointer. If these pointers are equal, then the process 650 returns to the start state 652. However, if these pointers are not equal, then the process 650 moves to a state 660 wherein the defer_data_ptr pointer is incremented. The process then ends at an end state 662.

If a determination is made at the decision state 656 that transfer type bit 4 was set, the process 650 moves to decision state 666 and makes a determination whether transfer type bit 5 has cleared. As indicated in Table 1, transfer type bit 5 is cleared when the PCI device has returned read data to the requested data buffer. Thus, transfer type bit 5 will be cleared once PCI deferred read data has been sent from the PCI bus to the current buffer.

If a determination is made at the decision state 666 that the transfer type bit 5 has not cleared, then the process 650 moves to state 667 and reads data coming from the target PCI device. The process 650 keeps checking at the decision state 666 whether the transfer type bit 5 has cleared as it is reading data at state 667. Once the complete set of data has come from the target PCI device, the transfer type bit 5 is cleared from the address buffer and the process 650 loads the count and asserts the HM_READ_STROBE signal at a state 668. The process 650 then makes a determination whether the HM_READ_BUSY signal is asserted at a decision state 670. If this signal is found to be busy at the decision state 670, then the process 650 loops at state 670 until the signal is no longer asserted, indicating that the master controller is available to accept data from the data buffers.

Once the HM_READ_BUSY signal is no longer asserted, the process 650 decrements the count at a state 672 and thereafter determines whether the count is at zero at a decision state 676. If the count is not zero at decision state 676, then the process 650 returns to the decision state 670 to determine whether the HM_READ_BUSY signal was asserted.

However, if the count is zero at the decision state 676 indicating that all of the data has been transferred to the bus master controller, then a determination is made at a decision state 680 as to whether the HM_DONE signal is asserted. If the HM_DONE signal is not asserted at the decision state 680, then the process loops at that state until the signal becomes asserted. Once the HM_DONE signal is asserted, the process 650 moves to a state 682 wherein the buffer valid bit and transfer type bit 4 are cleared. The process 650 then increments the defer_data_ptr pointer at the state 660 and completes at an end state 662.

Due to the flexibility of some embodiments of the dynamic buffer allocation system, several of the data transfers between the processor and the PCI bus may occur simultaneously. This may advantageously result in a higher data throughput between the processor and the PCI bus as compared to prior systems. For example, in the DBA system, data transfer from the processor to a first data buffer may occur concurrently with data transfer from a second data buffer to the PCI bus. In this manner, the system can be writing data from the processor to a first buffer, while the system is simultaneously writing from a second buffer to the PCI bus.

Similarly, the processor may be writing data to a first data buffer at the same time that data is being read from the PCI bus into a second data buffer. In addition, a deferred data read from a first data buffer to the processor may occur concurrently with a data read from the PCI bus to a second data buffer. Moreover, the dynamic allocation system may perform a deferred data read from a first data buffer to the processor at the same time that it performs a data write operation from a second data buffer to the PCI bus.

Several embodiments of the invention provide significant advantages. For example, in one embodiment the same set of data registers holds data that is flowing in both directions. Previous buffering schemes relied on pairs of unidirectional FIFO buffers to provide the desired bi-directional functionality. Because a pair of FIFO buffers requires many more transistors to implement than does a single FIFO buffer, the DBA system can be manufactured in many cases to be less expensive and more efficient than prior systems.

In addition, the DBA system provides advantages because it is not based on a First In/First Out scheme for managing data flow. For this reason, the system provides more data handling flexibility by allowing higher priority reads and writes to be executed before earlier, lower priority transactions. This is especially important with microprocessors such as the Intel Pentium® Pro which may execute many out of order instructions. Because these buffers are not controlled in a first in/first out manner, more flexibility is provided so that the most relevant data is handed off to the bus or processor before less relevant data.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

What is claimed is:

1. A bridge circuit in a computer system for providing data transfers between a processor and a peripheral device, comprising:

a first address buffer and a second address buffer, both in communication with a processor and a peripheral device;

a first data buffer and a second data buffer, both in communication with said processor, and said peripheral device;

control logic for controlling said first address buffer and said first data buffer as a matched pair so that an address held in said first address buffer corresponds to data held in said first data buffer and to allow data to be read from said first data buffer while an address is written to said first address buffer; and an arbiter for controlling concurrent bi-directional data flow between said processor and said peripheral device through said second buffer.

2. The bridge circuit of claim 1 wherein said processor is an Intel Pentium® Pro processor.

3. The bridge circuit of claim 1 wherein said peripheral device is a Peripheral Component Interconnect (PCI) device.

4. The bridge circuit of claim 1 wherein said first data buffer and second data buffer are in communication with said processor via a processor bus.

5. The bridge circuit of claim 1 wherein said first data buffer and said second data buffer are in communication with said peripheral device via a peripheral bus.

6. The bridge circuit of claim 5 wherein said peripheral bus is a Peripheral Component Interconnect (PCI) bus.

7. The bridge circuit of claim 1 wherein said first address buffer further comprises status bits.

8. The bridge circuit of claim 7 wherein said status bits relate to the type of request being made by the processor.

9. The bridge circuit of claim 1 comprising three address buffers and three data buffers.

10. In a computer system, a dynamic buffer system for controlling data flow between a processor and a Peripheral Component Interconnect (PCI) device, comprising:
   a first address buffer in communication with a processor and a PCI device;
   a first data buffer in communication with said processor, said PCI device and said first buffer;
   control logic controlling said first address buffer and said first data buffer as matched pairs so that an address stored in said first address buffer corresponds to data stored in said first data buffer and configured to allow data to be read from said first data buffer while an address is written to said first address buffer; and
   an arbiter for controlling bi-directional data flow between said processor and said PCI device, wherein said data is buffered by said second buffer.

11. The dynamic buffer system of claim 10, comprising a plurality of data buffers and a plurality of address buffers.

12. The dynamic buffer system of claim 11, wherein said plurality of address buffers comprises three buffers and said plurality of second buffers comprises three data buffers.

13. The dynamic buffer system of claim 10, wherein said first address buffer includes status bits.

14. The dynamic buffer system of claim 13, wherein said status bits relate to the type of request being made by said processor.

15. The dynamic buffer system of claim 13 wherein said status bits indicate whether a requested task has been completed.

16. The dynamic buffer system of claim 10 wherein said control logic comprises pointers for matching said first address buffer with said first data buffer.

17. The dynamic buffer system of claim 11 wherein said arbiter references pointers indicating which of said data buffers is available to accept new data.

18. In a computer system including a processor and a peripheral device, a dynamic buffer system for controlling data flow between a processor and a peripheral device, comprising:
   a plurality of address buffers in communication with said processor and said peripheral device;
   a plurality of bi-directional data buffers in communication with said processor, said peripheral device and said address buffer, each of said data buffers being associated with one of said address buffers;
   control logic configured to allow data to be transferred from one of said data buffers to said processor while data is being transferred from another of said data buffers to said peripheral device; and
   an arbiter for controlling bi-directional data flow between said processor and said peripheral device, wherein said data is buffered by said data buffer.

19. The computer system of claim 18 wherein said processor is a Pentium® Pro processor and said peripheral device is a PCI device.

20. The computer system of claim 19 wherein said address and data buffers are in communication with said PCI device via a PCI bus.

21. The computer system of claim 20 wherein said address buffers further comprise status bits.

22. The computer system of claim 21 wherein said status bits relate to the type of request being made by the Pentium® Pro processor.

23. The computer system of claim 18 comprising three address buffers and three data buffers.

24. The computer system of claim 23 wherein said control logic comprises pointers for matching each address buffer with a particular data buffer.

25. The computer system of claim 18 wherein said arbiter references pointers indicating which of said data buffers is free to accept new data.

26. A bridge circuit for controlling substantially concurrent data transfers between a processor and a peripheral device in a computer system, comprising:
   means for buffering address requests from said processor to said peripheral device;
   means for bi-directionally buffering data transfers between said processor and said peripheral device; and
   control logic for controlling said means for buffering and said means for bidirectionally buffering so that each of said buffered data transfers relates to an address held in said means for buffering.

27. The bridge circuit of claim 24 wherein said processor is an Intel Pentium® Pro processor.

28. The bridge circuit of claim 24 wherein said peripheral device is a Peripheral Component Interconnect (PCI) device.

29. The bridge circuit of claim 24 wherein said means for buffering includes a plurality of address buffers.

30. The bridge circuit of claim 26 wherein said means for bidirectionally buffering includes a plurality of data buffers.

31. The bridge circuit of claim 26 wherein said means for buffering includes an input arbiter and an output arbiter.

32. The bridge circuit of claim 26 wherein said means for bidirectionally buffering includes an input arbiter and an output arbiter.

33. In a computer system including a processor and a peripheral device, an integrated circuit for controlling data flow between a processor and a peripheral device, comprising:
   a processor bus master controller;
   a processor bus slave controller; and
   a dynamic allocation system in communication with said processor bus master controller and said processor bus slave controller, the dynamic allocation system comprising:
      an address buffer in communication with said processor and said peripheral device;
      a bi-directional data buffer in communication with said processor, said peripheral device and said address buffer;
      control logic for controlling said address buffer and said data buffer as matched pairs so that an address stored in an address buffer corresponds to data stored in said data buffer and for controlling bi-directional data flow between said processor and said peripheral device, wherein said data is buffered by said data buffer.

34. The computer system of claim 33 wherein said processor is a Pentium® Pro processor and said peripheral device is a PCI device.

35. The computer system of claim 34 wherein said address and data buffers are in communication with said PCI device via a PCI bus.

36. The computer system of claim 33 wherein said address buffers further comprise status bits.

37. The computer system of claim 33 wherein said integrated circuit further comprises a PCI target controller in communication with said peripheral device and said processor bus master controller.

38. The computer system of claim 33, further comprising an internal processor bus in communication with said processor bus master controller and said processor bus slave controller.

39. A bi-directional buffer for transferring address and data between components of a computer system comprising:
- a first buffer in communication with a first component for storing an address, said first buffer including status bits;
- a second buffer, matched with said first buffer so that said address stored in said first buffer is related to data stored in said second buffer;
- an arbiter in communication with said status bits, said arbiter providing signals granting concurrent access to said first buffer and said second buffer such that data can be written to said first buffer while data is read from said second buffer.

40. The bi-directional buffer of claim 39, wherein said status bits comprise transfer type bits indicative of the status of an address transfer from said first component to said first buffer.

41. The bi-directional buffer of claim 39, wherein said status bits comprise transfer type bits indicative of the status of a data transfer from said first component to said first buffer.

* * * * *

UNITED STATES PATENT AND TRADEMARK OFFICE
CERTIFICATE OF CORRECTION

PATENT NO. : 6,073,190
DATED : June 6, 2000
INVENTOR(S) : Jeffrey Jay Rooney

It is certified that error appears in the above-identified patent and that said Letters Patent is hereby corrected as shown below:

Column 14,
Line 13, replace "top_data_pr" with -- top_data_ptr --.

Signed and Sealed this

Fourth Day of December, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.    : 6,073,190
DATED         : June 6, 2000
INVENTOR(S)   : Jeffrey Jay Rooney It is certified that error appears in the above-identified patent and that said Letters Patent is hereby corrected as shown below:

Delete Column 26, Lines 7-55. (Claims 26-33)

Signed and Sealed this

Twenty-fourth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,073,190
DATED : June 6, 2000
INVENTOR(S) : Jeffrey Jay Rooney

It is certified that error appears in the above-identified patent and that said Letters Patent is hereby corrected as shown below:

Reinstate Column 26, lines 7-55. (Claims 26-33).

Column 26,
Lines 19, 21 and 23, please change "24" to -- 26 --.

Signed and Sealed this

Twenty-fourth Day of August, 2004

JON W. DUDAS
*Director of the United States Patent and Trademark Office*